(12) United States Patent
Seok et al.

(10) Patent No.: US 11,825,460 B2
(45) Date of Patent: Nov. 21, 2023

(54) EXTREME-HIGH-THROUGHPUT MULTI-LINK DYNAMIC ANTENNA SWITCHING IN WIRELESS COMMUNICATIONS

(71) Applicant: MediaTek Singapore Pte. Ltd., Singapore (SG)

(72) Inventors: Yongho Seok, San Jose, CA (US); Hung-Tao Hsieh, Hsinchu (TW); Cheng-Yi Chang, Hsinchu (TW); James Chih-Shi Yee, San Jose, CA (US)

(73) Assignee: MediaTek Singapore Pte. Ltd., Singapore (SG)

( * ) Notice: Subject to any disclaimer, the term of this patent is extended or adjusted under 35 U.S.C. 154(b) by 91 days.

(21) Appl. No.: 17/330,398

(22) Filed: May 25, 2021

(65) Prior Publication Data

US 2021/0377928 A1 Dec. 2, 2021

Related U.S. Application Data

(60) Provisional application No. 63/030,333, filed on May 27, 2020.

(51) Int. Cl.
*H04W 72/04* (2023.01)
*H04W 72/044* (2023.01)
*H04W 74/08* (2009.01)
*H04W 88/08* (2009.01)

(52) U.S. Cl.
CPC ..... *H04W 72/046* (2013.01); *H04W 74/0808* (2013.01); *H04W 88/08* (2013.01)

(58) Field of Classification Search
CPC ........... H04W 72/046; H04W 74/0808; H04W 88/08; H04W 16/28; H04W 74/0816; H04W 29/06; H04W 7/06; H04W 7/0628; H04W 69/14
See application file for complete search history.

(56) References Cited

U.S. PATENT DOCUMENTS

| 2009/0279514 | A1* | 11/2009 | Seok | H04W 74/0816 370/336 |
| 2015/0063189 | A1* | 3/2015 | Merlin | H04W 72/23 370/312 |
| 2016/0037531 | A1* | 2/2016 | Lu | H04B 7/15507 370/315 |

(Continued)

FOREIGN PATENT DOCUMENTS

| WO | WO 2018136520 A1 | 7/2018 |
| WO | WO 2020028415 A1 | 2/2020 |

OTHER PUBLICATIONS

European Patent Office, European Extended Search Report for European Patent Application No. 21176019.4, dated Nov. 10, 2021.

(Continued)

*Primary Examiner* — Mewale A Ambaye
(74) *Attorney, Agent, or Firm* — Han IP PLLC; Andy M. Han

(57) ABSTRACT

A non-access point (non-AP) station (STA) multi-link device (MLD) receives a transmission from an access point (AP) MLD. In response to receiving the transmission, the non-AP STA MLD communicates with the AP MLD using an increased number of spatial streams with multi-link dynamic antenna switching at the non-AP STA MLD.

20 Claims, 16 Drawing Sheets

(56) References Cited

U.S. PATENT DOCUMENTS

2018/0206143 A1 7/2018 Patil et al.
2019/0158385 A1 5/2019 Patil et al.
2019/0335454 A1 10/2019 Huang et al.

OTHER PUBLICATIONS

Taewon Song, "RTS/CTS for multi-link", IEEE Draft; 11-20-0430-00-00BE-RTS-CTS-FOR-MULTI-LINK, IEEE-SA Mentor, Piscataway, NJ, USA, vol. 802.11 EHT; 802.11be, Mar. 23, 2020, pp. 1-16, XP068167567.
Minyoung Park, "Enhanced multi-link single radio operation", IEEE Draft, 11-20-0562-01-00BE-Enhanced-Multi-Link-Single-Radio-Operation, IEEE-SA Mentor, Piscataway, NJ, USA, vol. 802.11 EHT; 802.11be, No. 1, May 15, 2020, pp. 1-14, XP068167935.
Yongho Seok, "Multi-link Spatial Multiplexing", IEEE Draft; 11-20-0883-00-00BE-MULTI-LINK-SPATIAL-Multiplexing, IEEE-SA Mentor, Piscataway, NJ, USA, vol. 802.11 EHT; 802.11be, Jul. 2, 2020, pp. 1-14, XP068169740.
Khorov Evgeny et al., "Current Status and Directions of IEEE 802.11be, the Future Wi-Fi 7", IEEE Access, IEEE, USA, vol. 8, May 7, 2020, pp. 88664-88688, XP011789411.
Jeongki Kim, "EHT ower saving considering multi-link", IEEE Draft; 11-19-1510-05-00BE-EHT-POWER-SAVING-Considering-Multi-Link, IEEE-SA Mentor, Piscataway, NJ, USA, vol. 802.11 EHT; 802.11be, No. 5, Jan. 15, 2020, pp. 1-15, XP068165313.
Taiwan Intellectual Property Office, Office Action for Taiwan Patent Application No. 110119123, dated Dec. 28, 2021.

\* cited by examiner

200

| Rx HE-MCS MAP ≤80 MHz | Tx HE-MCS MAP ≤80 MHz | Rx HE-MCS MAP 160 MHz | Tx HE-MCS MAP 160 MHz | Rx HE-MCS MAP 80+80 MHz | Tx HE-MCS MAP 80+80 MHz |
|---|---|---|---|---|---|
| 2 | 2 | 0 OR 2 | 0 OR 2 | 0 OR 2 | 0 OR 2 |

OCTETS:

ESTABLISH A MULTI-LINK OPERATION OVER A PLURALITY OF LINKS BETWEEN AN ACCESS POINT (AP) MULTI-LINK DEVICE (MLD) AND A NON-AP STATION (STA) MLD WHICH HAS A CONSTRAINT ON SIMULTANEOUS TRANSMISSION AND RECEPTION (TX/RX) ON A FIRST LINK AND A SECOND LINK OF THE PLURALITY OF LINKS
1610

CHANGE AN ANTENNA CONFIGURATION OF THE NON-AP STA MLD WITH RESPECT TO ONE OR MORE RECEIVE CHAINS OR ONE OR MORE TRANSMIT CHAINS OF THE NON-AP STA MLD BETWEEN THE FIRST LINK AND THE SECOND LINK OF THE PLURALITY OF LINKS IN RESPONSE TO A CONDITION BEING MET
1620

FIG. 16

EXTREME-HIGH-THROUGHPUT MULTI-LINK DYNAMIC ANTENNA SWITCHING IN WIRELESS COMMUNICATIONS

CROSS REFERENCE TO RELATED PATENT APPLICATION

The present disclosure is part of a non-provisional patent application claiming the priority benefit of U.S. Provisional Patent Application No. 63/030,333, filed on 27 May 2020, the content of which being incorporated by reference in its entirety.

TECHNICAL FIELD

The present disclosure is generally related to wireless communications and, more particularly, to extreme-high-throughput (EHT) multi-link dynamic antenna switching in wireless communications.

BACKGROUND

Unless otherwise indicated herein, approaches described in this section are not prior art to the claims listed below and are not admitted as prior art by inclusion in this section.

In wireless communications such as those in a wireless local area network (WLAN) according to the Institute of Electrical and Electronics Engineers (IEEE) 802.11 Specifications, a multi-link capable device such a station (STA) multi-link device (MLD) can communicate on multiple links including a first link (link 1) and a second link (link 2). In such case, the STA MLD's antenna capabilities can be said to include support for R1 receive chains and T1 transmit chains on link 1 as well as support for R2 receive chains and T2 transmit chains on link 2. With multi-link dynamic antenna switching, the STA MLD can support R1+R2 receive chains and T1+T2 transmit chains on link 1 and link 2, respectively. However, the total receive chains and the total transmit chains over all of the multiple links cannot be greater than R1+R2 and T1+T2, respectively. Therefore, there is a need for a solution to manage EHT multi-link dynamic antenna switching efficiently without sacrificing performance.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to provide schemes, concepts, designs, techniques, methods and apparatuses pertaining to EHT multi-link dynamic antenna switching in wireless communications. Under various proposed schemes in accordance with the present disclosure, the aforementioned issue may be addressed.

In one aspect, a method may involve receiving a transmission from an access point (AP) MLD by a non-AP STA MLD. The method may also involve communicating with the AP MLD using an increased number of spatial streams with multi-link dynamic antenna switching at the non-AP STA MLD in response to the receiving.

In another aspect, a method may involve establishing a multi-link operation over a plurality of links between an AP MLD and a non-AP STA MLD which has a constraint on simultaneous transmission and reception (Tx/Rx) on a first link and a second link of the plurality of links. The method may also involve, in response to a condition being met, changing an antenna configuration of the non-AP STA MLD with respect to one or more receive chains or one or more transmit chains of the non-AP STA MLD between the first link and the second link of the plurality of links.

In yet another aspect, an apparatus may include a transceiver configured to communicate wirelessly and a processor coupled to the transceiver. The processor may be configured to establish, via the transceiver, a multi-link operation over a plurality of links between an AP MLD and a non-AP STA MLD. The processor may also be configured to communicate, via the transceiver, with multi-link dynamic antenna switching, multi-link static antenna switching, or multi-link semi-static antenna switching. In communicating with the multi-link dynamic antenna switching, the processor receive a transmission from the AP MLD and communicate with the AP MLD using an increased number of spatial streams in response to the receiving. In communicating with the multi-link static antenna switching or multi-link semi-static antenna switching, the processor may determine that a condition is met and, in response to the determination, change an antenna configuration of the non-AP STA MLD with respect to one or more receive chains or one or more transmit chains of the non-AP STA MLD between a first link and a second link of the plurality of links. The condition may involve either detecting a change in channel utilization or detecting an onset of a target wake time (TWT) session period (SP).

It is noteworthy that, although description provided herein may be in the context of certain radio access technologies, networks and network topologies such as, Wi-Fi, the proposed concepts, schemes and any variation(s)/derivative(s) thereof may be implemented in, for and by other types of radio access technologies, networks and network topologies such as, for example and without limitation, Bluetooth, ZigBee, 5$^{th}$ Generation (5G)/New Radio (NR), Long-Term Evolution (LTE), LTE-Advanced, LTE-Advanced Pro, Internet-of-Things (IoT), Industrial IoT (IIoT) and narrowband IoT (NB-IoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation to clearly illustrate the concept of the present disclosure.

FIG. 2 is a diagram of an example design in accordance with an implementation of the present disclosure.

FIG. 16 is a flowchart of an example process in accordance with an implementation of the present disclosure.

DETAILED DESCRIPTION OF PREFERRED EMBODIMENTS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to EHT multi-link dynamic antenna switching in wireless communications. According to the present disclosure, a number of possible solutions may be implemented separately or jointly. That is, although these possible solutions may be described below separately, two or more of these possible solutions may be implemented in one combination or another.

Figure 1:
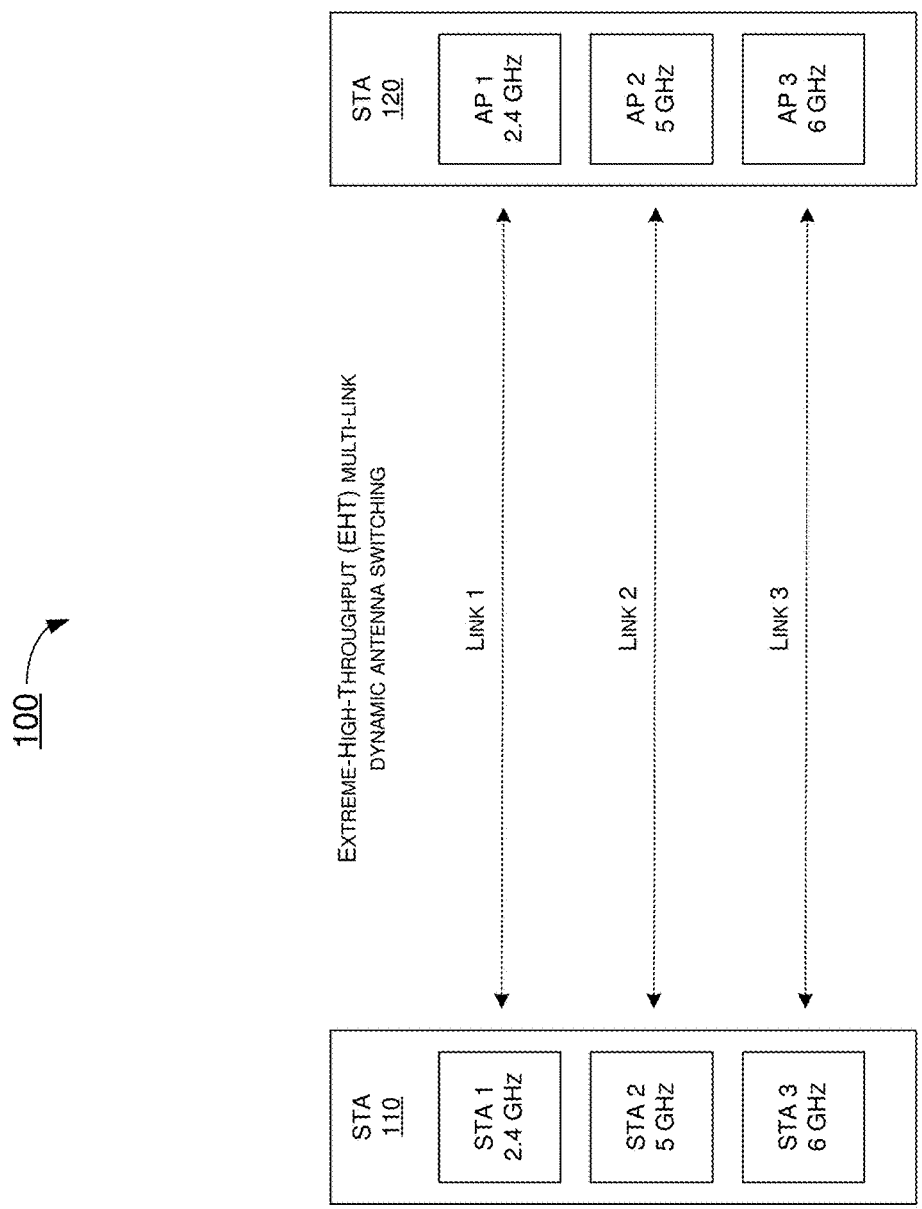
FIG. 1 is a diagram of an example network environment in which various solutions and schemes in accordance with the present disclosure may be implemented.

FIG. 1 illustrates an example network environment 100 in which various solutions and schemes in accordance with the present disclosure may be implemented. FIG. 2~FIG. 16 illustrate examples of implementation of various proposed schemes in network environment 100 in accordance with the present disclosure. The following description of various proposed schemes is provided with reference to FIG. 1~FIG. 16.

Referring to FIG. 1, network environment 100 may involve a STA 110 and a STA 120 communicating wirelessly over multiple links (e.g., link 1, link 2 and link 3), or communication channels, in accordance with one or more Institute of Electrical and Electronics Engineers (IEEE) 802.11 standards such as IEEE 802.11be and beyond. Each of STA 110 and STA 120 may function as an MLD. For instance, STA 110 may function as a non-AP MLD with multiple virtual STAs (e.g., STA 1, STA 2 and STA 3) operating within STA 110. Correspondingly, STA 120 may function as an AP MLD with multiple virtual APs (e.g., AP 1, AP 2 and AP 3) operating within STA 120. Each of the multiple virtual STAs in the non-AP MLD implemented in STA 110 and each of the multiple virtual APs in the AP MLD implemented in STA 120 may transmit and receive over one or more of the multiple links under some constraints due to in-device coexistence (IDC) interference. That is, STA 110 may function as a constrained non-AP MLD while STA 120 may function as a constrained AP MLD. In the context of EHT multi-link operation with constrained multi-link channel access, a constrained MLD, herein interchangeably referred to as a non-simultaneous transmission/reception (non-STR) MLD, is an MLD with which IDC interference occurs when more than one STA within the MLD simultaneously transmits and receives frames on multiple links. Accordingly, a STA of a constrained MLD should not access a second link for transmission while the STA is receiving frame(s) on a first link, in case the STA has a constraint on simultaneous transmission/reception operation on the first link and the second link. Under various proposed schemes in accordance with the present disclosure, STA 110, STA 120 and STA 130 may be configured to perform EHT multi-link dynamic antenna switching in wireless communications according to various proposed schemes described herein. It is noteworthy that, in the description herein and in the Figures, the term "0SS" denotes "zero spatial stream", the term "1SS" denotes "one spatial stream", and the term "2SS" denotes "two spatial streams" in use for transmission and/or reception.

In a dynamic spatial multiplexing (SM) save mode, a non-AP high-efficiency (HE) STA that sets the HE Dynamic SM Power Save subfield in the HE medium access control (MAC) Capabilities Information field of the HE Capabilities element it transmits to 1 or that sets the SM Power Save subfield in the HE 6 GHz Band Capabilities element it transmits to 1 needs to a predefined dynamic SM power save procedures except that the non-AP HE STA can enable its multiple receive chains if it receives a Trigger frame. The non-AP HE STA enables its multiple receive chains if it receives a Trigger frame that starts a frame exchange sequence. Such a frame exchange sequence needs to satisfy certain conditions. Firstly, the starting Trigger frame needs to be transmitted with a single spatial stream. Secondly, the starting Trigger frame needs to be from an associated AP or from an AP corresponding to the transmitted basic service set identifier (BSSID) if the non-AP HE STA is associated with a non-transmitted BSSID and has indicated support for receiving Control frames with timing advance (TA) set to the transmitted BSSID by setting the Rx Control Frame To MultiBSS subfield to 1 in the HE Capabilities element that the non-AP HE STA transmits. Thirdly, the starting Trigger frame needs to be an MU-RTS Trigger frame, Buffer Status Report Poll (BSRP) Trigger frame, or BQRP Trigger frame that includes a User Info field with the AID12 subfield equal to the 12 least-significant bits (LSBs) of the association identifier (AID) of the non-AP HE STA. The non-AP HE STA needs to, subject to its spatial stream capabilities, be capable of receiving a Physical Layer Convergence Protocol (PLCP) Protocol Data Unit (PPDU) that is sent using more than one spatial stream a short inter-frame space (SIFS) after the end of its response frame transmission. The non-AP HE STA switches to a multiple receive chain mode if it receives the Trigger frame addressed to it and switches back immediately after the frame exchange sequence ends.

FIG. 2 illustrates an example design 200 in accordance with an implementation of the present disclosure. FIG. 2 shows a Supported HE-MCS And NSS Set field in a HE Capabilities element, which a STA MLD (e.g., STA 110) may utilize to indicate, for each supported link, the combinations of EHT-modulation and coding schemes (MCSs) and spatial streams that a given STA of a plurality of STAs in the STA MLD supports for reception (Rx) and the combinations of EHT-MCSs and spatial streams that the given STA supports for transmission (Tx). Additionally, the STA may indicate the total supported Rx/Tx spatial streams for all supported links. As an MLD-level capability, the Supported HE-MCS And NSS Set field may be utilized to indicate the combinations of EHT-MCSs and spatial streams that all STAs in the STA MLD support for reception and the combinations of EHT-MCSs and spatial streams that all STAs in the STA MLD support for transmission.

Under a proposed scheme in accordance with the present disclosure, when the multi-link dynamic antenna switching is enabled at a constrained STA MLD. Under the proposed scheme, the STA MLD (e.g., STA 110) may enable its multiple receive chains (and transmit chains) in case it receives a request-to-send (RTS) or multi-user request-to-send (MU-RTS) frame and responds with a clear-to-send (CTS) frame, where the RTS or MU-RTS frame starts a frame exchange sequence. The RTS or MU-RTS frame may be transmitted with a single spatial stream, and the RTS or MU-RTS frame may be sent from an associated AP (e.g., STA 120). The MU-RTS Trigger frame may include a User Info field with an AID12 subfield equal to the twelve least-significant bits (LSBs) of the association identifier (AID) of the STA of the STA MLD. Under the proposed scheme, the STA MLD may enable its multiple transmit chains (and multiple receive chains) in case it transmits a RTS frame and receives a CTS frame. Additionally, the AP MLD may transmit to the STA MLD that enabled its multiple receive chains a PPDU up to the total supported Rx spatial streams of the STA MLD. Moreover, the AP MLD may initiate from the STA MLD that enabled its multiple transmit chains a trigger-based (TB) PPDU up to the total supported Tx spatial streams of the STA MLD.

Figure 3:
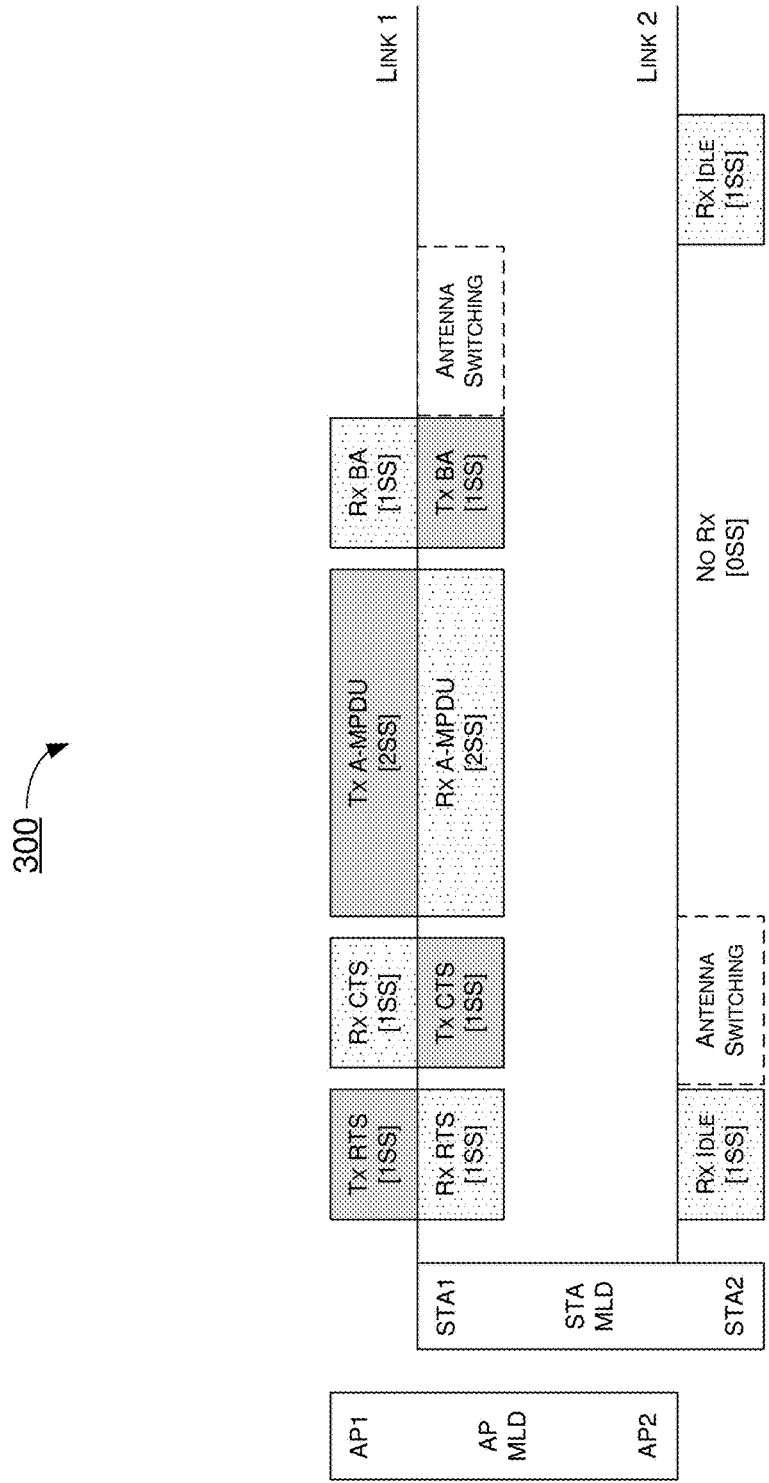
FIG. 3 is a diagram of an example scenario in accordance with an implementation of the present disclosure.

FIG. 3 illustrates an example scenario 300 with respect to switching of receive chains of a constrained MLD in accordance with an implementation of the present disclosure. Scenario 300 may involve an non-AP STA MLD (e.g., STA 110) and an AP MLD (e.g., STA 120) operating on at least a first link (link 1) and a second link (link 2). After STA1 in the STA MLD receives a RTS frame on link 1 addressed to itself and while STA1 transmits a CTS frame in response to receiving the RTS frame, STA2 in the STA MLD may switch all receive chains on link 2 to link 1. In scenario 300, AP1 in the AP MLD may transmit a PPDU up to the total supported Rx spatial streams of the STA MLD, instead of the supported Rx spatial streams of each link. At the end of the transmission opportunity (TXOP), STA1 may switch at least one of its receive chains from link 1 to link 2.

Figure 4:
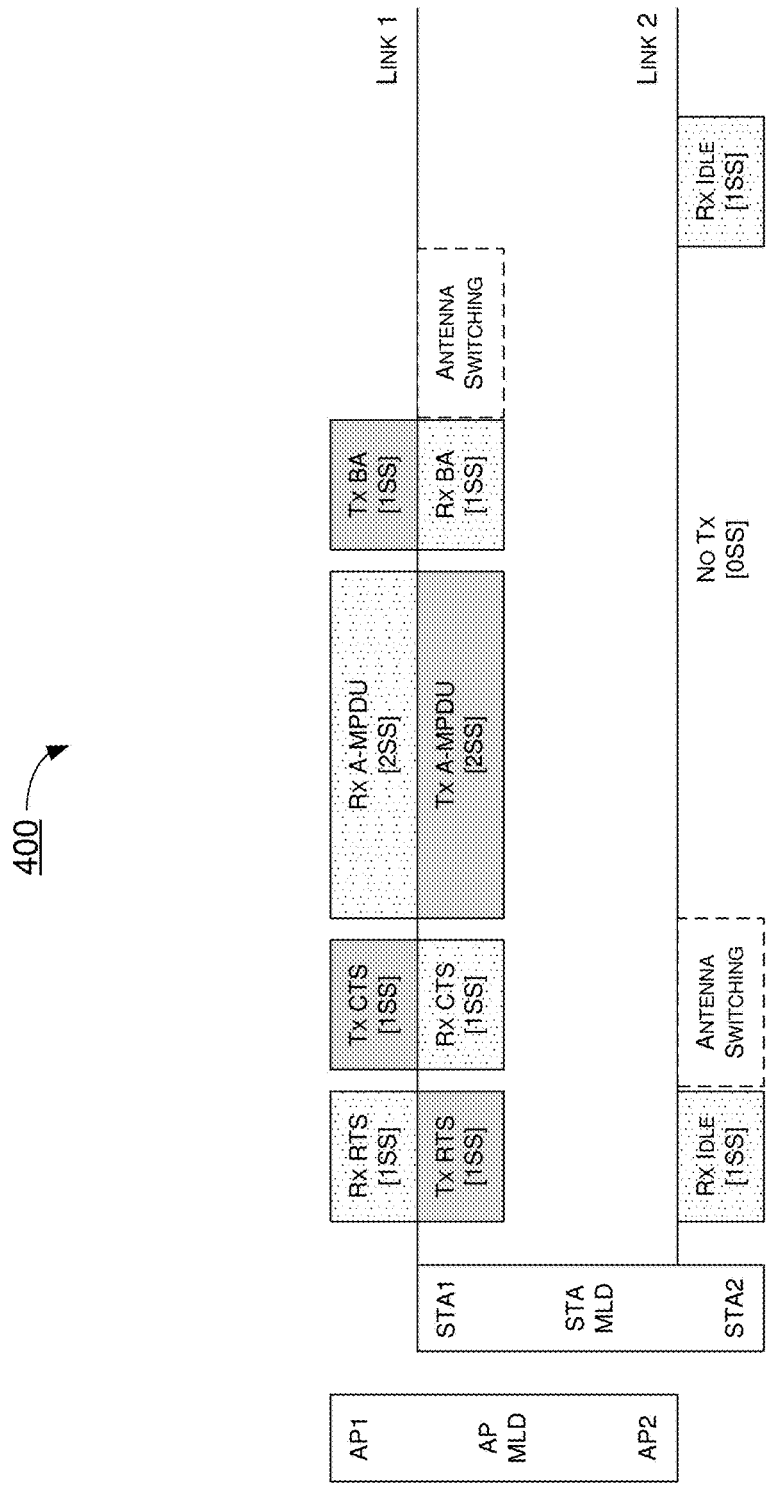
FIG. 4 is a diagram of an example scenario in accordance with an implementation of the present disclosure.

FIG. 4 illustrates an example scenario 400 with respect to switching of transmit chains of a constrained MLD in accordance with an implementation of the present disclosure. Scenario 400 may involve an non-AP STA MLD (e.g., STA 110) and an AP MLD (e.g., STA 120) operating on at least a first link (link 1) and a second link (link 2). After STA1 in the STA MLD receives a PHY-RxSTART.indication primitive of a CTS frame sent in a response to the RTS frame and while STA1 receives a CTS frame, STA2 may switch all transmit chains on link 2 to link 1. At the end of the TXOP, STA1 may switch at least one of the transmit chains from link 1 to link 2.

Figure 5:
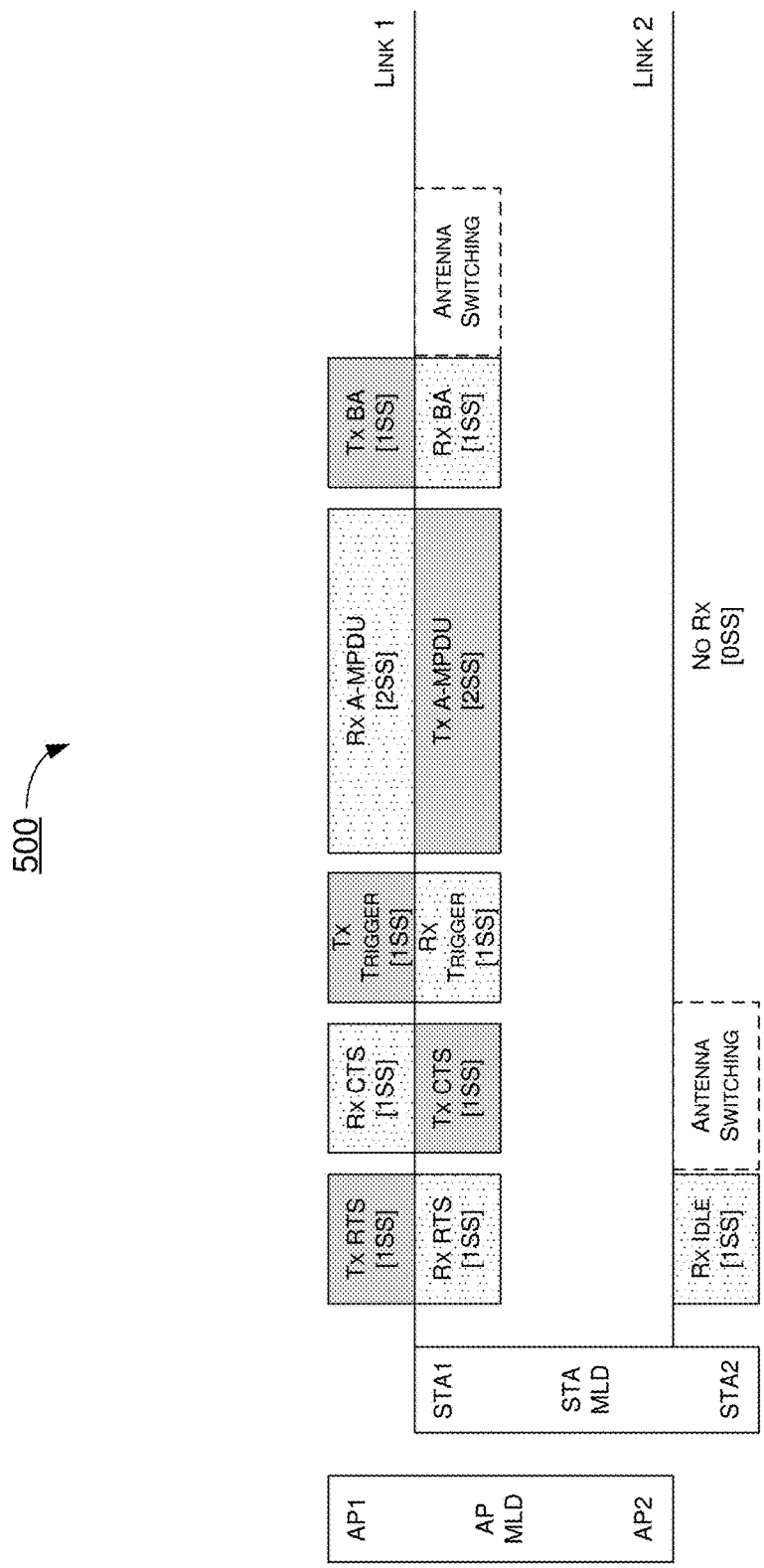
FIG. 5 is a diagram of an example scenario in accordance with an implementation of the present disclosure.

FIG. 5 illustrates an example scenario 500 with respect to switching of transmit chains of a constrained MLD in accordance with an implementation of the present disclosure. Scenario 500 may involve an non-AP STA MLD (e.g., STA 110) and an AP MLD (e.g., STA 120) operating on at least a first link (link 1) and a second link (link 2). After STA1 in the STA MLD receives a RTS frame on link 1 addressed to itself and while STA1 transmits a CTS frame in response to receiving the RTS frame, STA2 in the STA MLD may switch all receive and transmit chains on link 2 to link 1. In scenario 500, AP1 in the AP MLD may trigger STA1 by transmitting a TB PPDU to STA1 up to the total supported Tx spatial streams of the STA MLD, instead of the supported Tx spatial streams of each link. At the end of the TXOP, STA1 may switch at least one of its receive and transmit chains from link 1 to link 2.

Under a proposed scheme in accordance with the present disclosure, when multi-link dynamic antenna switching is enabled at a non-constrained STA MLD (herein interchangeable referred to as a "simultaneous transmission/reception MLD" or "STR MLD"), the STA MLD may enable its multiple transmit chains in case it transmits a RTS frame and receives a CTS frame. Moreover, the STA MLD may enable its multiple receive chains in case it receives a RTS or MU-RTS frame and responds with a CTS frame, where the RTS or MU-RTS frame starts a frame exchange sequence. The RTS or MU-RTS frame may be transmitted with a single spatial stream, and the RTS or MU-RTS frame may be sent from an associated AP (e.g., STA 120). The MU-RTS Trigger frame may include a User Info field with an AID12 subfield equal to the twelve LSBs of the AID of the STA of the STA MLD. Under the proposed scheme, an receive chains negotiation procedure may be performed. For the receive chains negotiation procedure, the MU-RTS Trigger may include a User Info field with a spatial stream (SS) Allocation/Random Access (RA)-Resource Unit (RU) Information subfield equal to a requested receive chains (or spatial streams). Moreover, in case the STA MLD supports the requested receive chains (or spatial streams) by switching the available receive chains on other link(s), the STA MLD may respond with a CTS frame; otherwise the STA MLD may not respond with a CTS frame.

Figure 6:
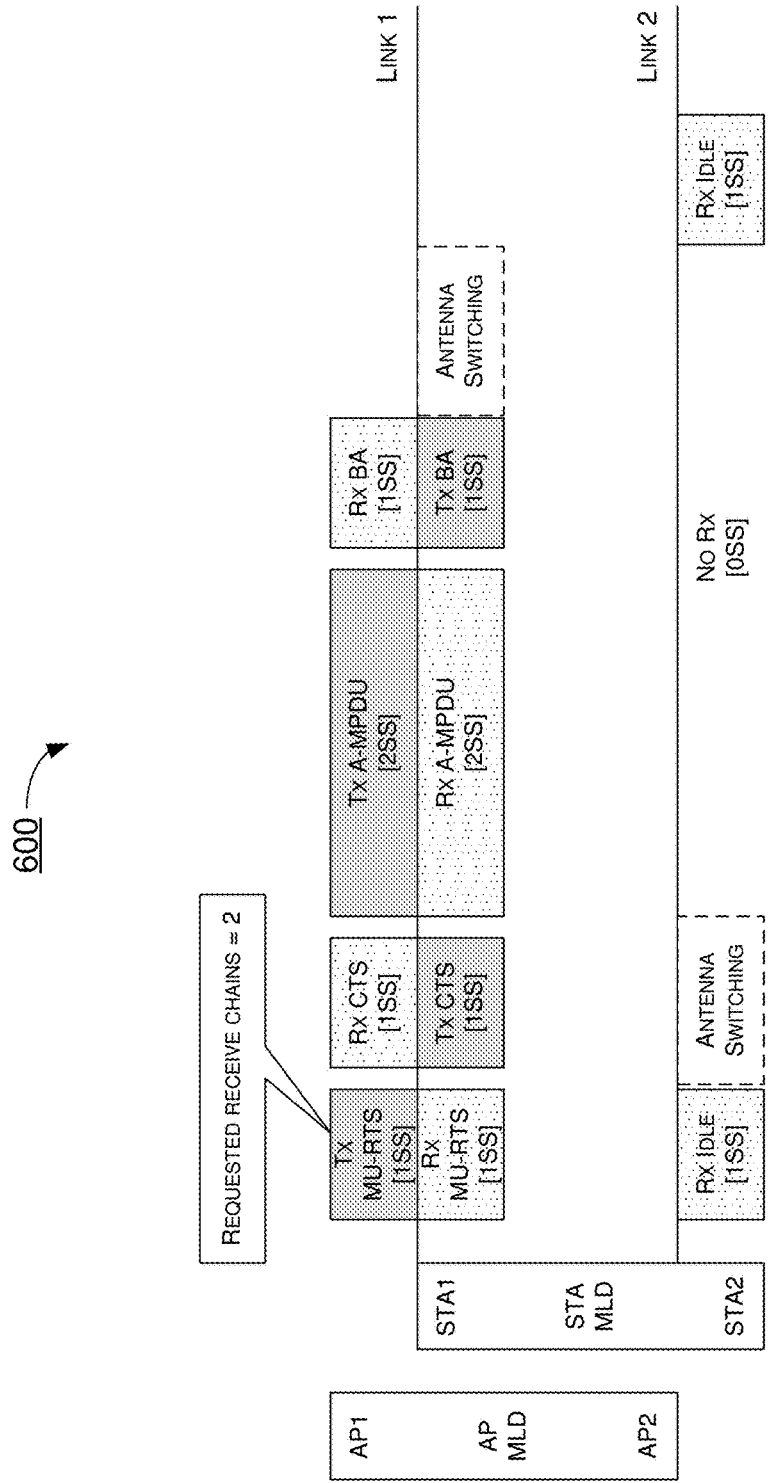
FIG. 6 is a diagram of an example scenario in accordance with an implementation of the present disclosure.

FIG. 6 illustrates an example scenario 600 with respect to switching of receive chains of a non-constrained MLD in accordance with an implementation of the present disclosure. Scenario 600 may involve an non-AP STA MLD (e.g., STA 110) and an AP MLD (e.g., STA 120) operating on at least a first link (link 1) and a second link (link 2). After STA1 in the STA MLD receives a MU-RTS frame addressed to itself and while STA1 transmits a CTS frame, STA2 in STA MLD may switch, for meeting the requested receive chains, one or more of available receive chains on link 2 to link 1. In scenario 600, AP1 in AP MLD may transmit a PPDU up to the requested receive chains indicated in the MU-RTS frame. At the end of the TXOP, STA1 may switch at least one of the receive chains from link 1 to link 2.

Figure 7:
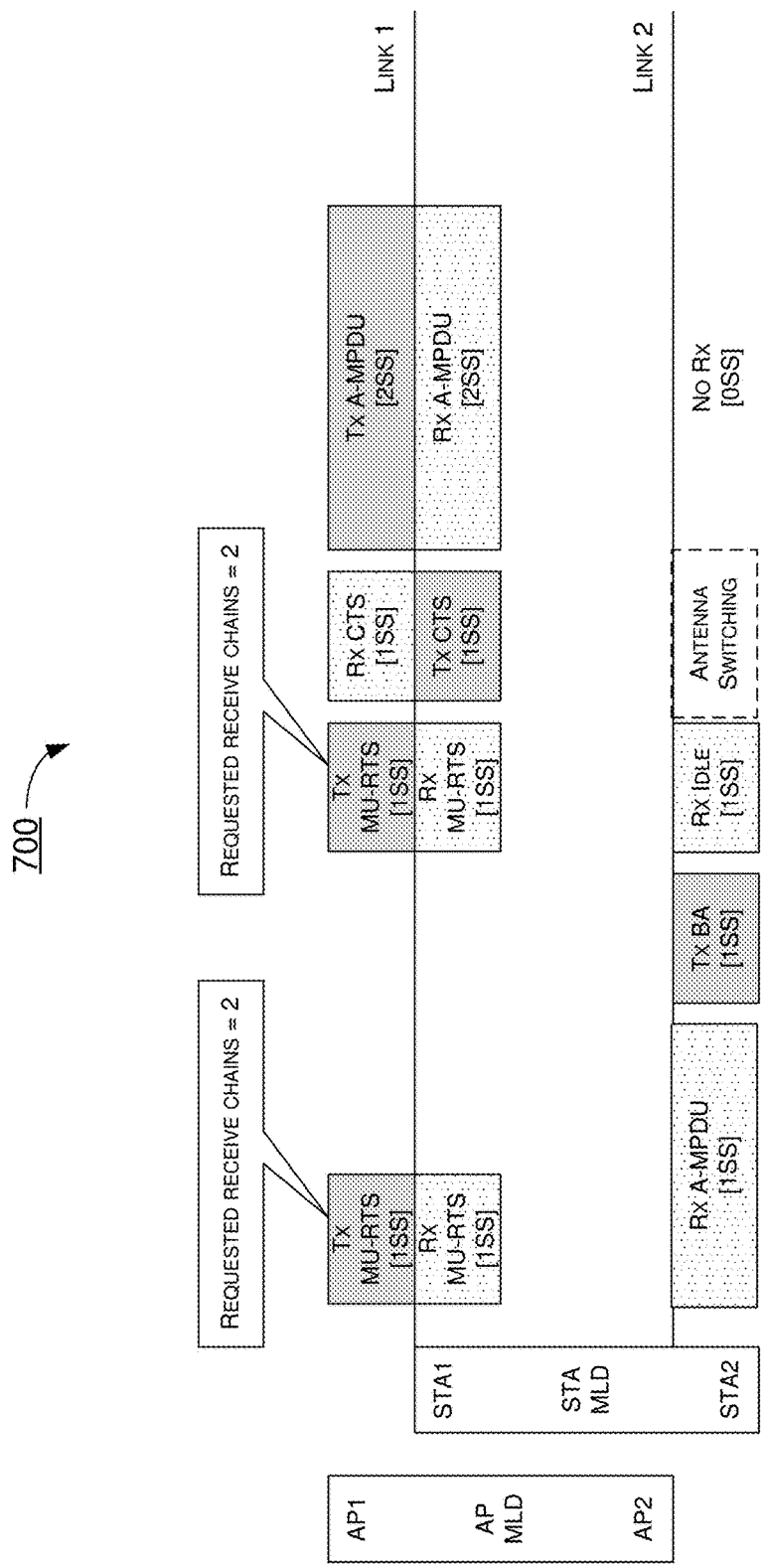
FIG. 7 is a diagram of an example scenario in accordance with an implementation of the present disclosure.

FIG. 7 illustrates an example scenario 700 with respect to switching of receive chains of a non-constrained MLD in accordance with an implementation of the present disclosure. Scenario 700 may involve an non-AP STA MLD (e.g., STA 110) and an AP MLD (e.g., STA 120) operating on at least a first link (link 1) and a second link (link 2). After STA1 in the STA MLD receives a first MU-RTS frame addressed to itself, STA1 may determine that it cannot meet the requested receive chains. As such, STA1 may not respond with a CTS frame. However, since STA1 can meet the requested receive chains in a second MU-RTS frame, STA1 may respond with a CTS frame and STA1 in STA MLD may switch, for meeting the requested receive chains, one or more of available receive chains on link 2 to link 1.

Figure 8:
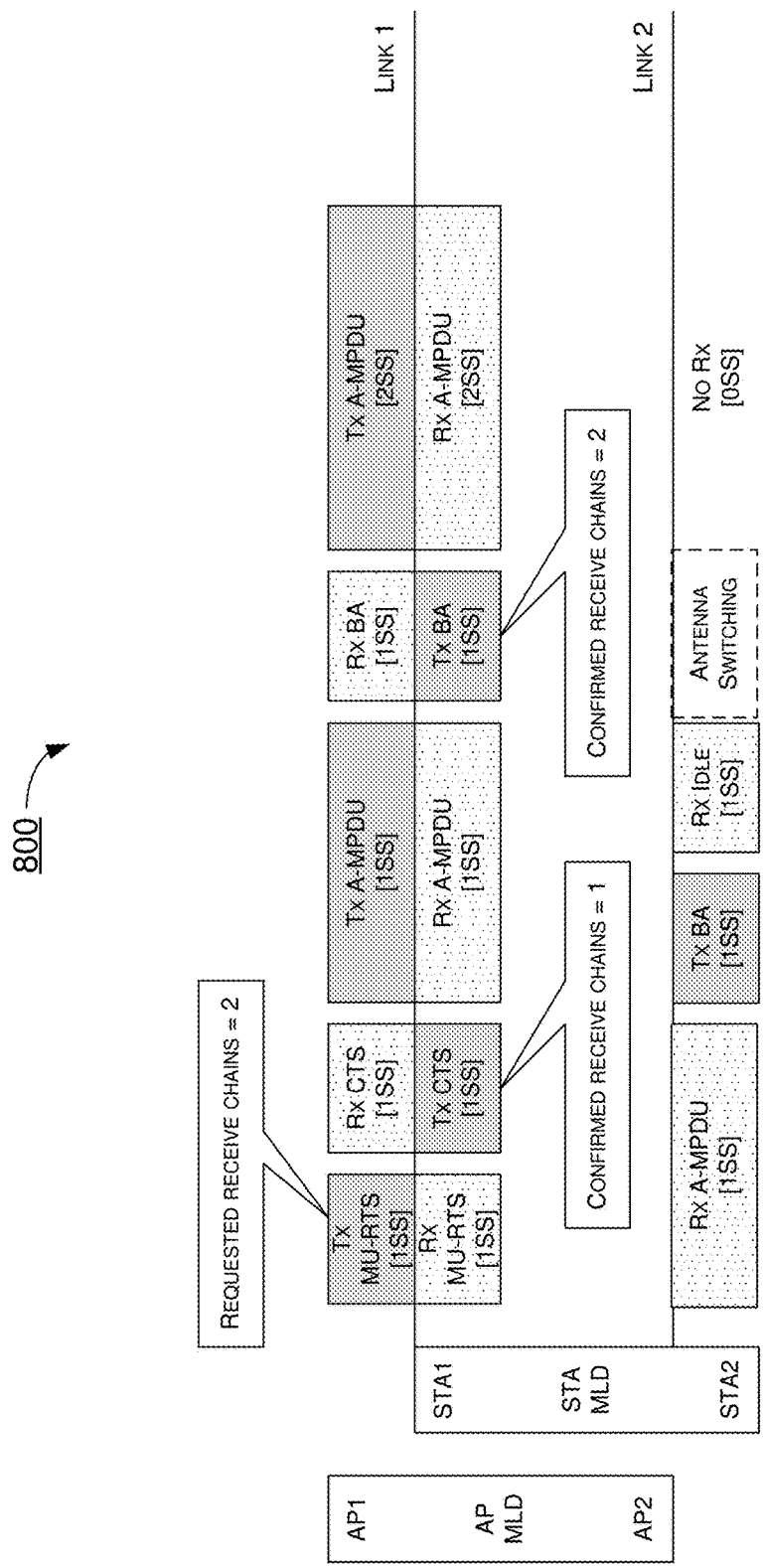
FIG. 8 is a diagram of an example scenario in accordance with an implementation of the present disclosure.

FIG. 8 illustrates an example scenario 800 with respect to switching of receive chains of a non-constrained MLD in accordance with an implementation of the present disclosure. Scenario 800 may involve an non-AP STA MLD (e.g., STA 110) and an AP MLD (e.g., STA 120) operating on at least a first link (link 1) and a second link (link 2). In scenario 800, an receive chains negotiation procedure may be enhanced by adding information of confirmed receive chains to the CTS and block acknowledgement (BA) frames. For instance, after STA1 in STA MLD receives a MU-RTS frame, STA1 may transmit a CTS frame indicating information of the confirmed receive chains. Then, the TXOP holder may transmit a PPDU up to the spatial streams supported by the information of confirmed receive chains. Additionally, the BA frame may be utilized to update the information of confirmed receive chains during the TXOP.

Figure 9:
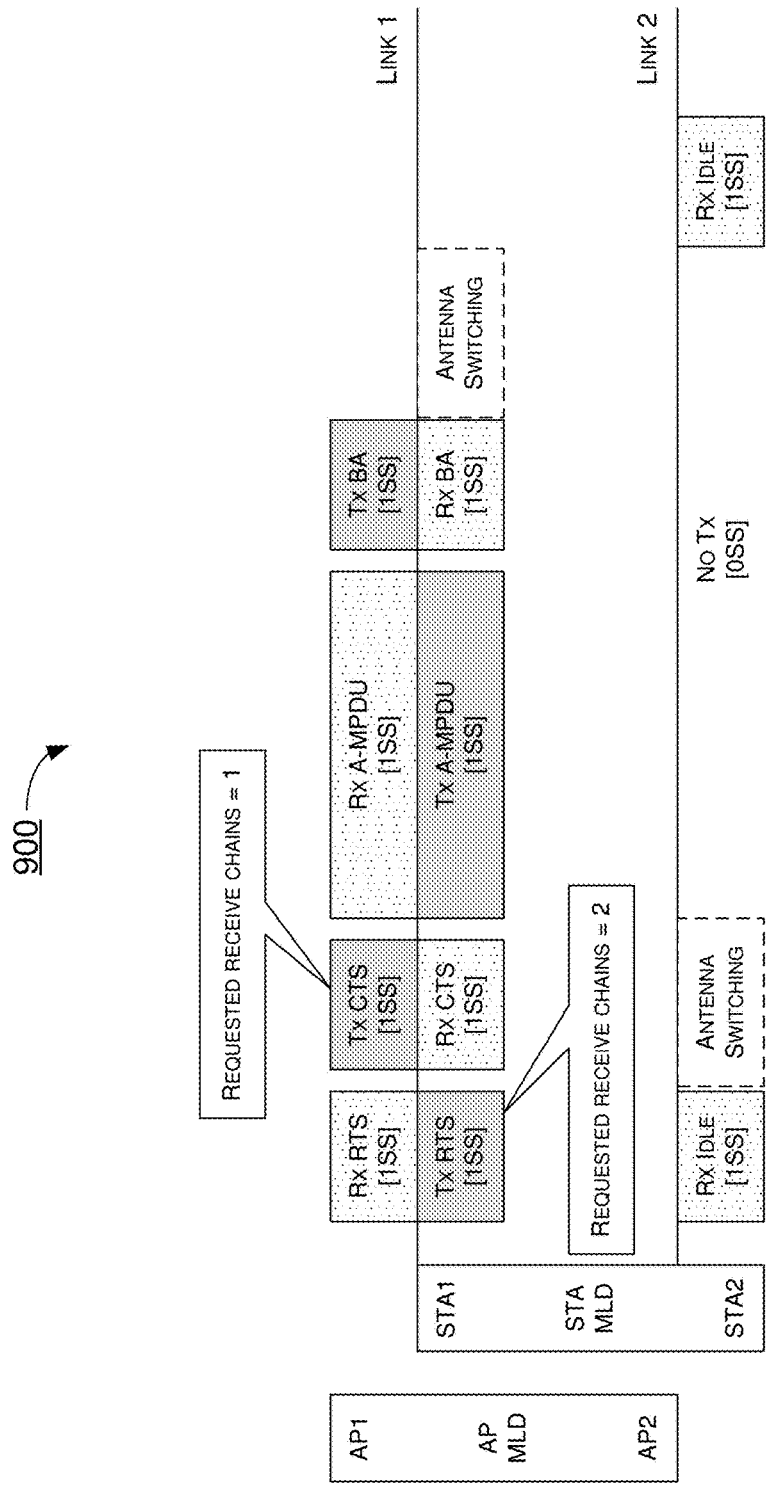
FIG. 9 is a diagram of an example scenario in accordance with an implementation of the present disclosure.

FIG. 9 illustrates an example scenario 900 with respect to switching of transmit chains of a non-constrained MLD in accordance with an implementation of the present disclosure. Scenario 900 may involve an non-AP STA MLD (e.g., STA 110) and an AP MLD (e.g., STA 120) operating on at least a first link (link 1) and a second link (link 2). In scenario 900, when multi-link dynamic antenna switching is also enabled at a non-constrained AP MLD, the receive chains negotiation procedure may be used by a STA MLD in an transmit chain switching procedure. For instance, the STA MLD may transmit a RTS frame with information of requested receive chains equal to 2. However, the AP MLD may respond with a CTS frame with information of confirmed receive chains equal to 1. Then, the TXOP holder (e.g., STA1 in the STA MLD) may transmit a PPDU up to one spatial stream indicated by the information of confirmed receive chains.

Under a proposed scheme in accordance with the present disclosure, when multi-link dynamic antenna switching is enabled at a STA MLD, the STA MLD may enable its multiple receive chains (and transmit chains) in case it receives a MU-RTS Trigger frame or a BSRP Trigger frame and responds with a CTS frame or a TB PPDU, respectively, where the MU-RTS frame or the BSRP Trigger frame may start a frame exchange sequence. The MU-RTS frame and the BSRP Trigger frame may be transmitted with a single spatial stream, and the MU-RTS frame and the BSRP Trigger frame may be sent from an associated AP (e.g., STA 120). The MU-RTS Trigger frame and the BSRP Trigger frame may include a User Info field with an AID12 subfield equal to the twelve LSBs of the AID of the STA of the STA MLD. Under the proposed scheme, the STA MLD may enable its multiple transmit chains (and receive chains) in case it transmits a RTS frame and receives a CTS frame. Additionally, the AP MLD may transmit to the STA MLD that enabled its multiple receive chains a PPDU up to the total supported Rx spatial streams of the STA MLD. Moreover, the AP MLD may initiate from the STA MLD that enabled its multiple transmit chains a TB PPDU up to the total supported Tx spatial streams of the STA MLD.

Figure 10:
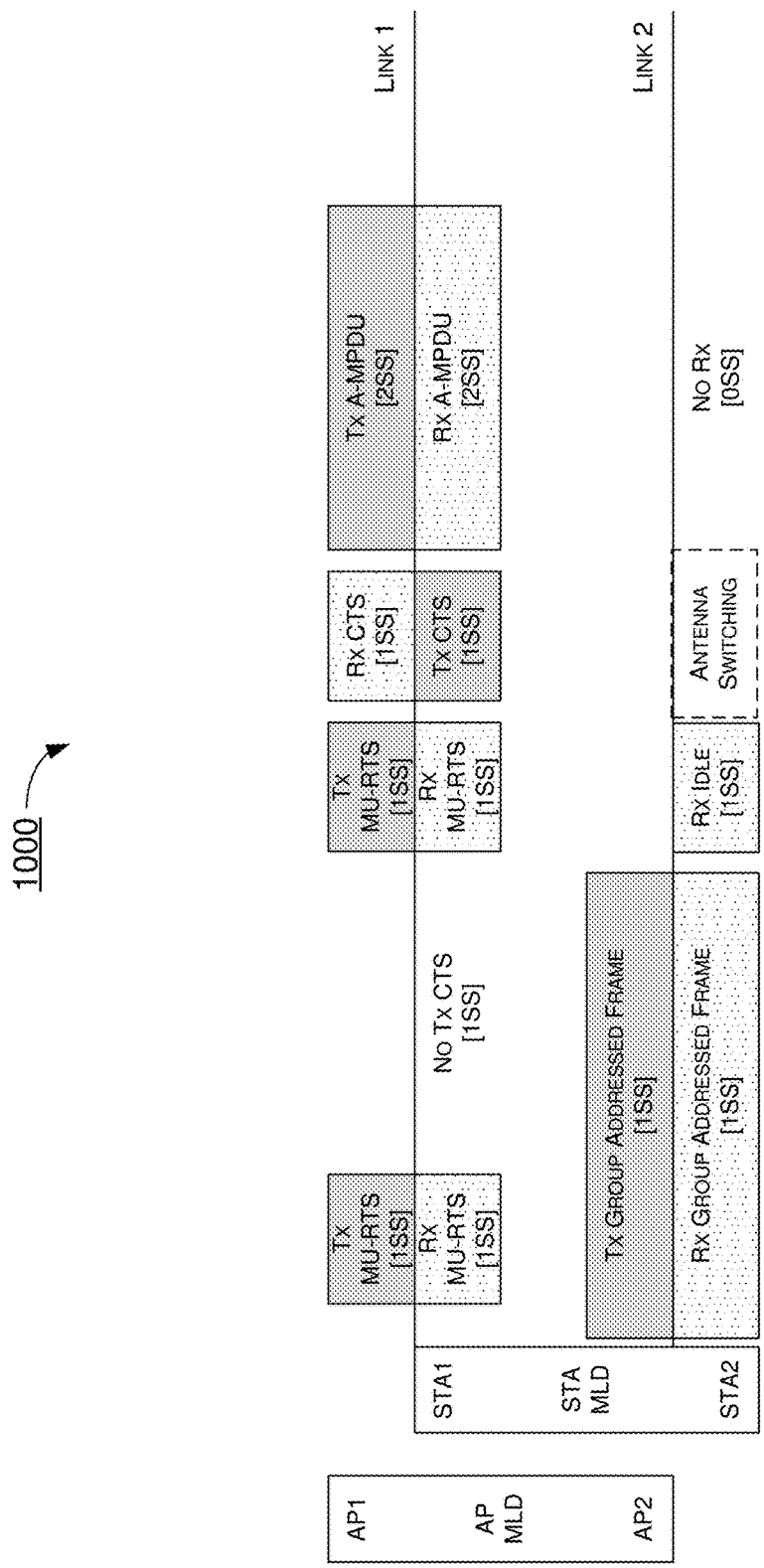
FIG. 10 is a diagram of an example scenario in accordance with an implementation of the present disclosure.

FIG. 10 illustrates an example scenario 1000 with respect to switching of receive chains of a non-constrained MLD in accordance with an implementation of the present disclosure. Scenario 1000 may involve an non-AP STA MLD (e.g., STA 110) and an AP MLD (e.g., STA 120) operating on at least a first link (link 1) and a second link (link 2). In scenario 1000, with multi-link dynamic antenna switching enabled at the STA MLD, the STA MLD may receive a group addressed frame from the AP MLD. Moreover, in case the AP MLD simultaneously initiates a frame exchange with the STA MLD, the STA MLD may not respond with a CTS frame or a TB PPDU. This is because, in an event that the STA MLD responds with a CTS frame or a TB PPDU and the AP MLD transmits to the STA MLD a PPDU, then the STA MLD would not be able to decode that PPDU since the STA MLD is receiving a group addressed frame.

Figure 11:
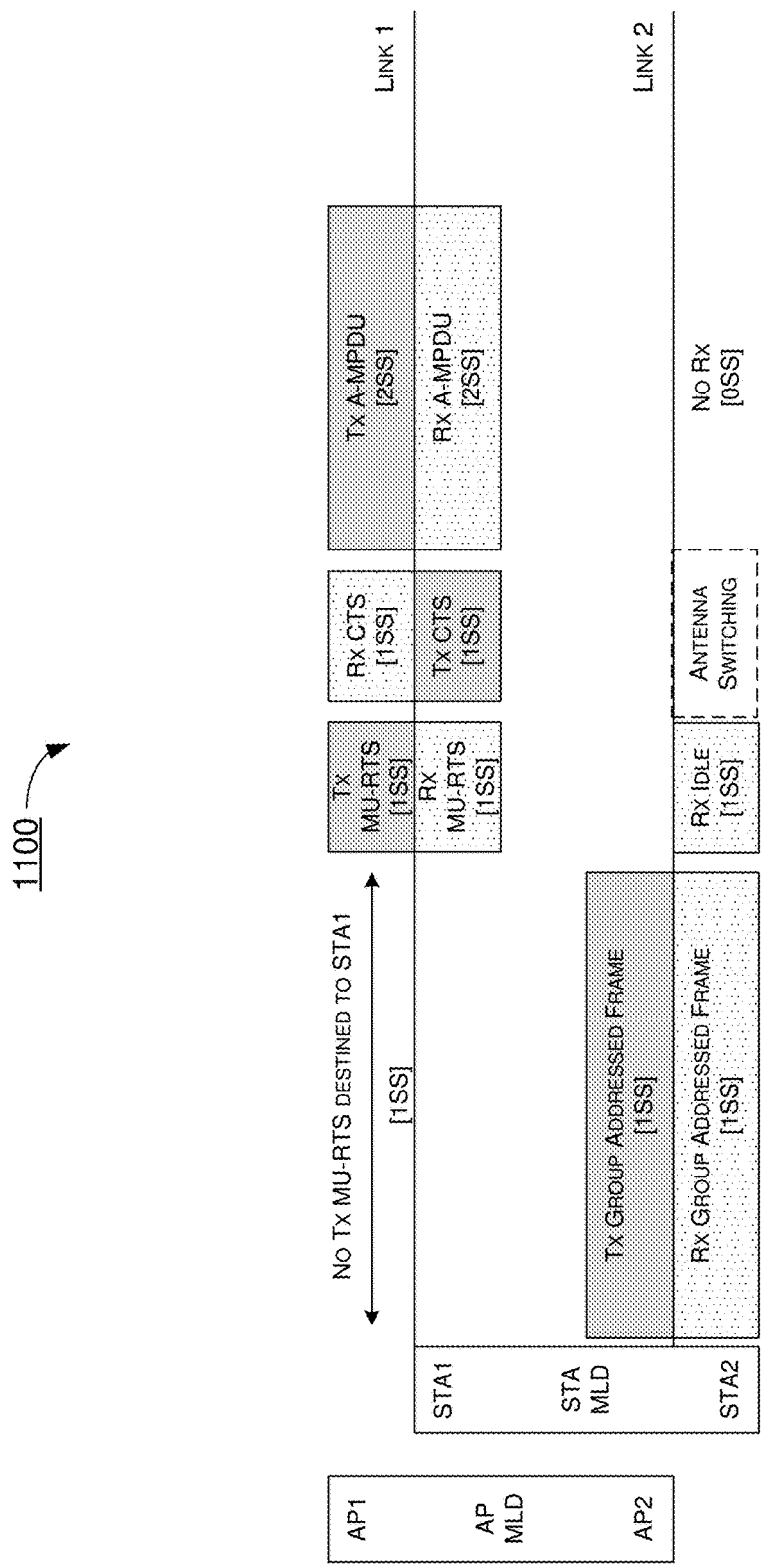
FIG. 11 is a diagram of an example scenario in accordance with an implementation of the present disclosure.

FIG. 11 illustrates an example scenario 1100 with respect to switching of receive chains of a non-constrained MLD in accordance with an implementation of the present disclosure. Scenario 1100 may involve an non-AP STA MLD (e.g., STA 110) and an AP MLD (e.g., STA 120) operating on at least a first link (link 1) and a second link (link 2), and scenario 1100 shows an alternative to scenario 1000. In scenario 1100, a STA in the STA MLD may indicate to its associated AP MLD the link on which the STA receives a group addressed frame. Accordingly, the AP MLD may not initiate a frame exchange with the STA MLD while a group addressed frame is transmitted on that link. In other words, the AP MLD may not transmit a MU-RTS Trigger frame or a BSRP Trigger frame that includes a User Info field with the AID12 subfield equal to the twelve LSBs of the AID of the STA MLD while the AP MLD is transmitting a group addressed frame on the link used by the STA MLD to receive the group addressed frame.

Under a proposed scheme in accordance with the present disclosure, multi-link dynamic antenna switching may be enabled by sending a Multi-Link Dynamic Antenna Switching action frame in which a Multi-Link Dynamic Antenna Switching mode field is set to 1 (indicating "Enable"). Under the proposed scheme, the link on which the Multi-Link Dynamic Antenna Switching action frame is sent may be implicitly determined to the group addressed frame reception link of the corresponding STA MLD. Alternatively, the STA MLD may explicitly signal its group addressed frame reception link (e.g., Link ID thereof) in the Multi-Link Dynamic Antenna Switching action frame. Under the proposed scheme, multi-link dynamic antenna switching may be disabled by sending the Multi-Link Dynamic Antenna Switching action frame in which the Multi-Link Dynamic Antenna Switching mode field is set to 0 (indicating "Disable").

Under a proposed scheme in accordance with the present disclosure, antenna switching time may be determined by computing TxCTSTime+2×SIFSTime. For example, TxCTSTime may be equal to physical layer (PHY) preamble (16 µs)+SIGNAL (4 µs)+DATA (24 µs at 6 Mbps)=44 µs, and SIFSTime may be 16 µs. As such, TxCTSTime+2×SIFSTime=44 µs+2×16 µs=76 µs. In case a STA needs more time to perform antenna switching, the STA may request to add a Padding field to the MU-RTS frame. The maximum length of the Padding may be 16 µs or more (e.g., extended to more than 16 µs under IEEE 802.11be and beyond). Moreover, the antenna switching time may have about 100 µs of processing margin.

Figure 12:
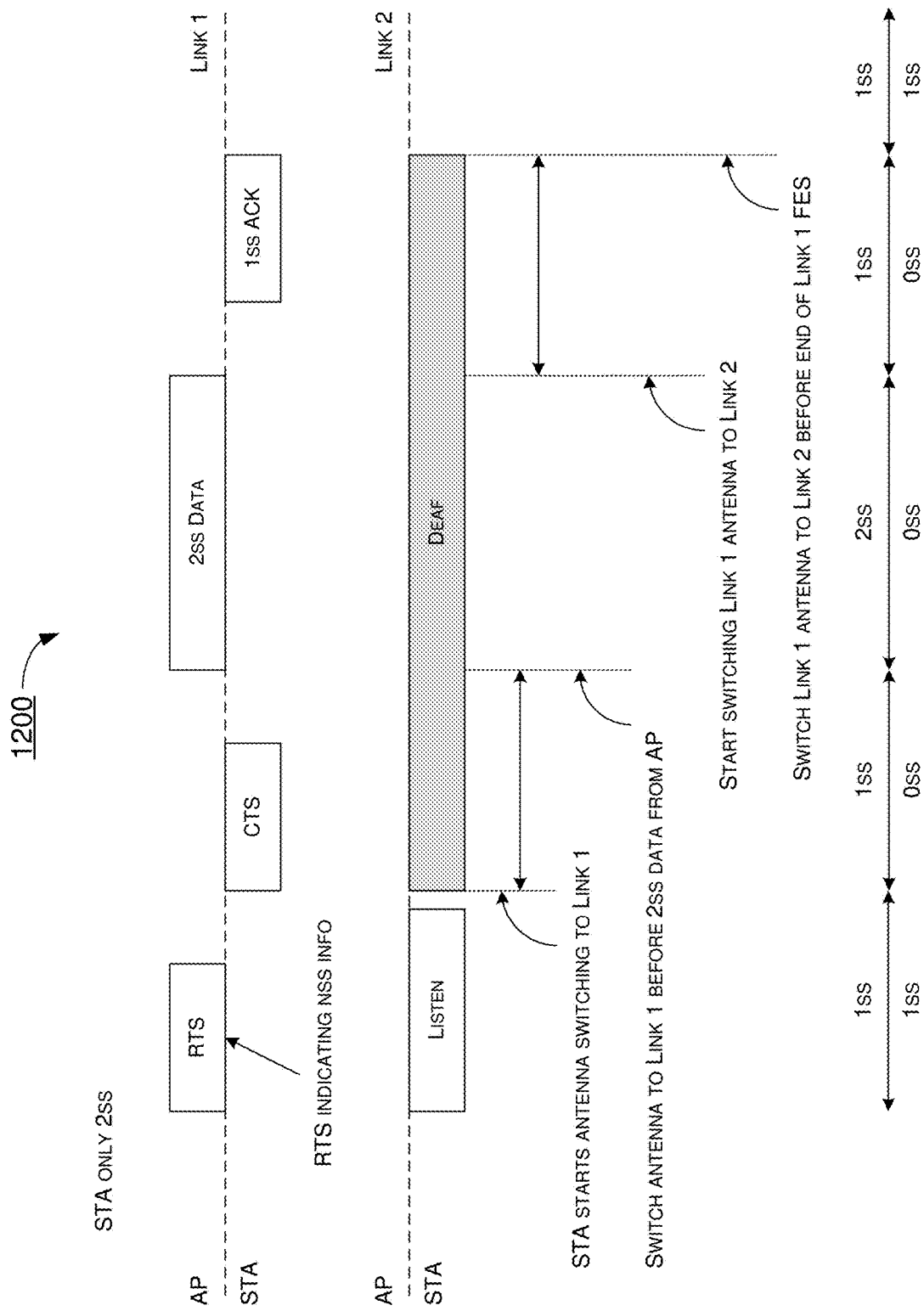
FIG. 12 is a diagram of an example scenario in accordance with an implementation of the present disclosure.
Figure 13:
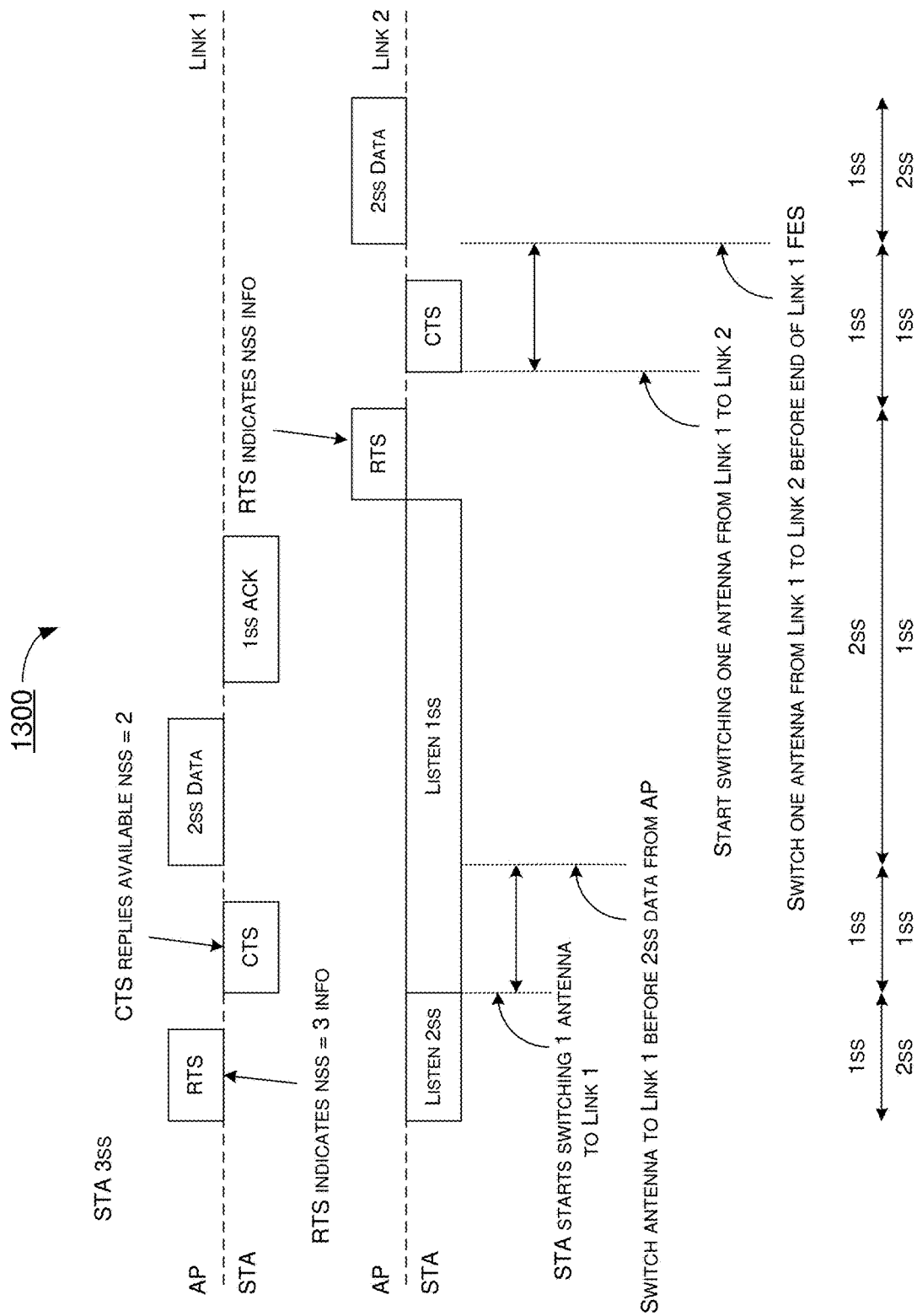
FIG. 13 is a diagram of an example scenario in accordance with an implementation of the present disclosure.

FIG. 12 illustrates an example scenario 1200 with respect to multi-link dynamic antenna switching in accordance with an implementation of the present disclosure. FIG. 13 illustrates an example scenario 1300 with respect to multi-link dynamic antenna switching in accordance with an implementation of the present disclosure.

Under a proposed scheme in accordance with the present disclosure with respect to multi-link static antenna switching, when multi-link static antenna switching is enabled at a constrained STA MLD, the STA MLD may transmit a management frame (e.g., an Antenna Configuration Switch management frame) to the AP MLD when antenna configuration is changed. For instance, the STA MLD may utilize the Antenna Configuration Switch management frame to indicate, for each supported link, the combinations of EHT-MCSs and spatial streams that a STA (e.g., STA1 or STA2) in STA MLD supports for reception and the combinations that the STA supports for transmission. Accordingly, under the proposed scheme, when STA MLD and AP MLD initially establish communications, they may independently configure their antennas with respect to the supported number of spatial streams for transmission and reception on each link of multiple links. Then, the initial configuration may be indicated in an Association Request frame and/or Association Response frame. Later on, when the antenna configuration is changed, the change in configuration may be indicated in the Antenna Configuration Switch management frame.

For instance, when a STA MLD (e.g., STA 110) sets up a multi-link operation with an AP MLD (e.g., STA 120) on link 1 and link 2, STA MLD may support the following antenna capabilities: (a) R1 receive chains and T1 transmit chains on link 1, and (b) R2 receive chains and T2 transmit chains on link 2. When channel utilization of each link is changed, STA MLD may change its antenna capabilities to the following: (a) R2 receive chains and T2 transmit chains on link 1, and (b) R1 receive chains and T1 transmit chains on link 2. In this case, STA MLD may transmit to the AP MLD the Antenna Configuration Switch management frame to indicate the changed transmit and receive chains for each supported link (e.g., link 1 and link 2).

Under a proposed scheme in accordance with the present disclosure with respect to multi-link semi-static antenna switching, when multi-link semi-static antenna switching is enabled at a constrained STA MLD, the STA MLD may set up with an AP MLD one or more TWT SPs on the multiple links (e.g., link 1 and link 2), where a pre-configured antenna configuration that is established at a given TWT Setup phrase may be applied during that specific TWT SP. In other words, when multiple TWT SPs are set up between the STA MLD and AP MLD, a respective antenna configuration may be set for each of the TWT SPs such that each of the TWT SPs may or may not have a different antenna configuration than that of another one of the TWT SPs. For instance, when a STA MLD (e.g., STA 110) sets up a multi-link operation with an AP MLD (e.g., STA 120), STA MLD may support the following antenna capabilities: (a) R1 receive chains and T1 transmit chains on link 1, and (b) R2 receive chains and T2 transmit chains on link 2. Moreover, STA MLD may set up TWT SPs on link 1 and link 2, where the TWT SPs on link 1 and link 2 do not overlap in time. During the negotiated TWT SPs, the pre-configured antenna configuration (e.g., R1+R2 receive chains and T1+T2 transmit chains) may be applied. In case the TWT SPs on link 1 and link 2 overlap in time, AP MLD may initiate a TXOP by sending the starting Trigger frame.

Illustrative Implementations

Figure 14:
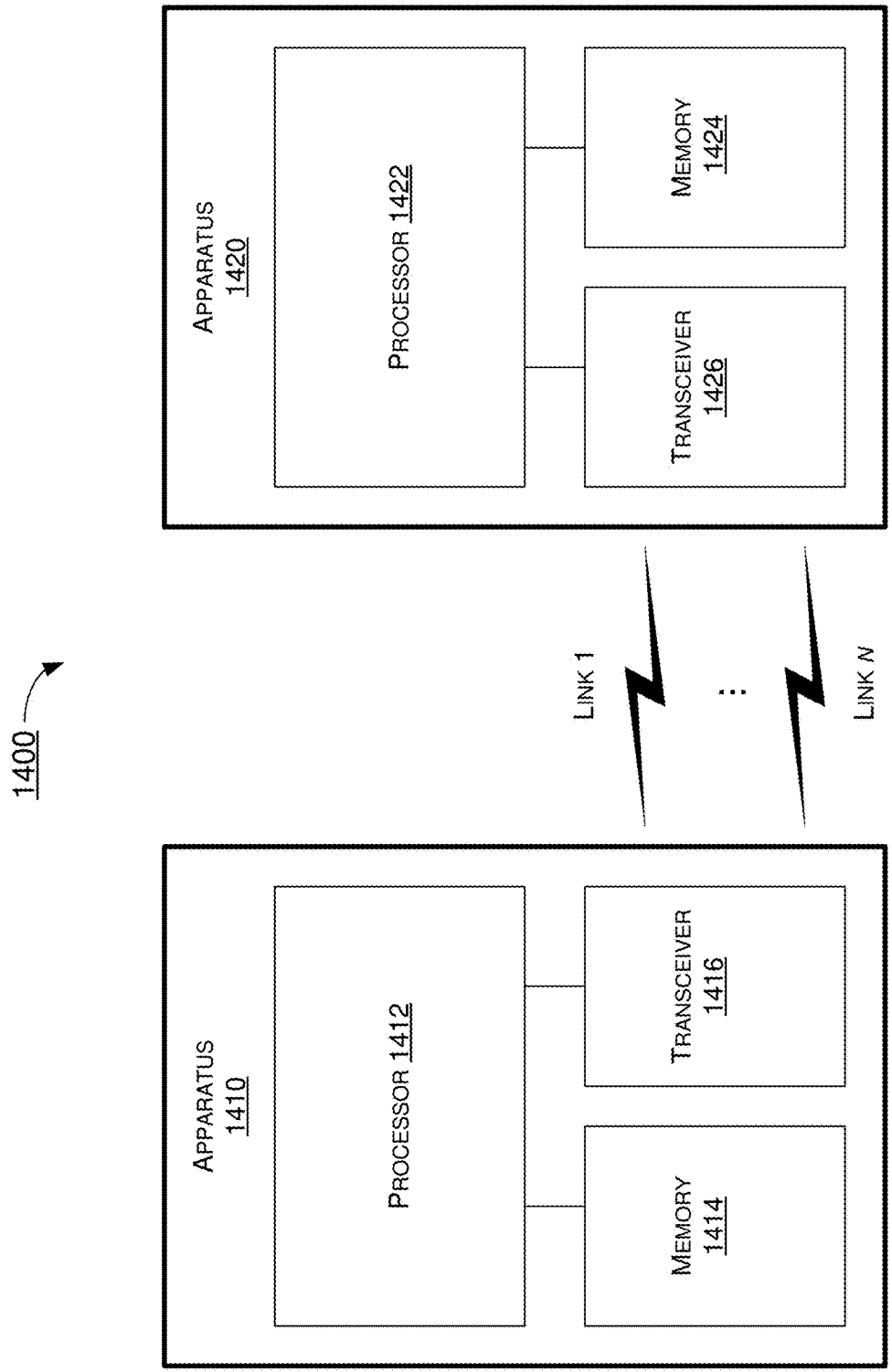
FIG. 14 is a block diagram of an example communication system in accordance with an implementation of the present disclosure.

FIG. 14 illustrates an example system 1400 having at least an example apparatus 1410 and an example apparatus 1420 in accordance with an implementation of the present disclosure. Each of apparatus 1410 and apparatus 1420 may perform various functions to implement schemes, techniques, processes and methods described herein pertaining to EHT multi-link dynamic antenna switching in wireless communications, including the various schemes described above with respect to various proposed designs, concepts, schemes, systems and methods described above as well as processes described below. For instance, apparatus 1410 may be an example implementation of STA 110, and apparatus 1420 may be an example implementation of STA 120.

Each of apparatus 1410 and apparatus 1420 may be a part of an electronic apparatus, which may be a STA or an AP, such as a portable or mobile apparatus, a wearable apparatus, a wireless communication apparatus or a computing apparatus. For instance, each of apparatus 1410 and apparatus 1420 may be implemented in a smartphone, a smart watch, a personal digital assistant, a digital camera, or a computing equipment such as a tablet computer, a laptop computer or a notebook computer. Each of apparatus 1410 and apparatus 1420 may also be a part of a machine type apparatus, which may be an IoT apparatus such as an immobile or a stationary apparatus, a home apparatus, a wire communication apparatus or a computing apparatus. For instance, each of apparatus 1410 and apparatus 1420 may be implemented in a smart thermostat, a smart fridge, a smart door lock, a wireless speaker or a home control center. When implemented in or as a network apparatus, apparatus 1410 and/or apparatus 1420 may be implemented in a network node, such as an AP in a WLAN.

In some implementations, each of apparatus 1410 and apparatus 1420 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. In the various schemes described above, each of apparatus 1410 and apparatus 1420 may be implemented in or as a STA or an AP. Each of apparatus 1410 and apparatus 1420 may include at least some of those components shown in FIG. 14 such as a processor 1412 and a processor 1422, respectively, for example. Each of apparatus 1410 and apparatus 1420 may further include one or more other components not pertinent to the proposed scheme of the present disclosure (e.g., internal power supply, display device and/or user interface device), and, thus, such component(s) of apparatus 1410 and apparatus 1420 are neither shown in FIG. 14 nor described below in the interest of simplicity and brevity.

In one aspect, each of processor 1412 and processor 1422 may be implemented in the form of one or more single-core processors, one or more multi-core processors, one or more RISC processors or one or more CISC processors. That is, even though a singular term "a processor" is used herein to refer to processor 1412 and processor 1422, each of processor 1412 and processor 1422 may include multiple processors in some implementations and a single processor in other implementations in accordance with the present disclosure. In another aspect, each of processor 1412 and processor 1422 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 1412 and processor 1422 is a special-purpose machine specifically designed, arranged and configured to perform specific tasks including those pertaining to EHT multi-link dynamic antenna switching in wireless communications in accordance with various implementations of the present disclosure.

In some implementations, apparatus 1410 may also include a transceiver 1416 coupled to processor 1412. Transceiver 1416 may be capable of wirelessly transmitting and receiving data. In some implementations, apparatus 1420 may also include a transceiver 1426 coupled to processor 1422. Transceiver 1426 may include a transceiver capable of wirelessly transmitting and receiving data. Transceiver 1416 of apparatus 1410 and transceiver 1426 of apparatus 1420 may communicate each other over one or more of multiple links link 1~link N, with N>1, such as a first link and a second link.

In some implementations, apparatus 1410 may further include a memory 1414 coupled to processor 1412 and capable of being accessed by processor 1412 and storing data therein. In some implementations, apparatus 1420 may further include a memory 1424 coupled to processor 1422 and capable of being accessed by processor 1422 and storing data therein. Each of memory 1414 and memory 1424 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 1414 and memory 1424 may include a type of read-only memory (ROM) such as mask ROM, programmable ROM (PROM), erasable programmable ROM (EPROM) and/or electrically erasable programmable ROM (EEPROM). Alternatively, or additionally, each of memory 1414 and memory 1424 may include a type of non-volatile random-access memory (NVRAM) such as flash memory, solid-state memory, ferroelectric RAM (FeRAM), magnetoresistive RAM (MRAM) and/or phase-change memory.

Each of apparatus 1410 and apparatus 1420 may be a communication entity capable of communicating with each other using various proposed schemes in accordance with the present disclosure. For illustrative purposes and without limitation, a description of capabilities of apparatus 1410, as STA 110 which may be a constrained non-AP MLD, and apparatus 1420, as STA 120 which may be a constrained AP MLD, is provided below. It is noteworthy that, although the example implementations described below are provided in the context of WLAN, the same may be implemented in other types of networks.

Under a proposed scheme with respect to EHT multi-link antenna switching in wireless communications in accordance with the present disclosure, a non-AP STA MLD implemented in processor 1412 of apparatus 1410 may establish, via transceiver 1416, a multi-link operation over a plurality of links between an AP MLD (e.g., apparatus 1420) and the non-AP STA MLD. Moreover, processor 1412 may communicate, via transceiver 1416, with the AP MLD with multi-link dynamic antenna switching, multi-link static antenna switching, or multi-link semi-static antenna switching. In communicating with the multi-link dynamic antenna switching, processor 1412 may perform certain operations. For instance, processor 1412 may receive a transmission from the AP MLD. Additionally, processor 1412 may, in response to the receiving, communicate with the AP MLD using an increased number of spatial streams. In communicating with the multi-link static antenna switching or multi-link semi-static antenna switching, processor 1412 may perform other operations. For instance, processor 1412 may determine that a condition is met. Moreover, in response to such determination, processor 1412 may change an antenna configuration of the non-AP STA MLD with respect to one or more receive chains or one or more transmit chains of the non-AP STA MLD between a first link and a second link of the plurality of links. In such cases, the condition may involve either detecting a change in channel utilization or detecting an onset of a TWT SP.

Regarding multi-link dynamic antenna switching, processor 1412 may receive, via transceiver 1416, a transmission from the AP MLD. Additionally, processor 1412 may communicate, via transceiver 1416, with the AP MLD using an increased number of spatial streams with multi-link dynamic antenna switching at the non-AP STA MLD in response to the receiving.

In some implementations, in communicating with the AP MLD with multi-link dynamic antenna switching, processor 1412 may enable the multi-link dynamic antenna switching by: (a) receiving a request from the AP MLD requesting for a first number of spatial streams; (b) enabling a second number of spatial streams; and (c) communicating with the AP MLD using the second number of spatial streams. In some implementations, the second number may be equal to the first number. Alternatively, the second number may be different than (e.g., smaller than) the first number.

In some implementations, in receiving the transmission from the AP MLD, processor 1412 may receive a RTS frame, a MU-RTS frame, or a CTS frame via a single spatial stream from the AP MLD. In some implementations, in communicating with the AP MLD with multi-link dynamic antenna switching, processor 1412 may enable the multi-link dynamic antenna switching by: (a) enabling multiple receive chains on a first link of a plurality of links; (b) receiving a data unit addressed to a STA in the non-AP STA MLD from the AP MLD via multiple spatial streams through the multiple receive chains on the first link during a TXOP; and (c) switching one of the multiple receive chains from the first link to a second link of the plurality of links at an end of the TXOP. In such cases, a number of the multiple spatial streams may be up to a number of total supported spatial streams of the non-AP STA MLD for reception. Alternatively, in communicating with the AP MLD with multi-link dynamic antenna switching processor 1412 may enable the multi-link dynamic antenna switching by: (a) enabling multiple transmit chains on a first link of a plurality of links; (b) transmitting a data unit from a STA in the non-AP STA MLD to the AP MLD via multiple spatial streams through the multiple transmit chains on the first link during a TXOP; and (c) switching one of the multiple transmit chains from the first link to a second link of the plurality of links at an end of the TXOP. In such cases, a number of the multiple spatial streams may be up to a number of total supported spatial streams of the non-AP STA MLD for transmission. In some implementations, in transmitting the data unit, processor 1412 may perform certain operations. For instance, processor 1412 may receive a TB PPDU from the AP MLD. Additionally, processor 1412 may transmit the data unit to the AP MLD responsive to receiving the TB PPDU.

In some implementations, in receiving the transmission from the AP MLD, processor 1412 may receive a MU-RTS trigger frame, a BSRP trigger frame, or a CTS frame with a single spatial stream from the AP MLD. In some implementations, in communicating with the AP MLD with multi-link dynamic antenna switching, processor 1412 may enable the multi-link dynamic antenna switching by: (a) enabling multiple receive chains on a first link of a plurality of links; (b) receiving a data unit addressed to a STA in the non-AP STA MLD from the AP MLD via multiple spatial streams through the multiple receive chains on the first link during a TXOP; and (c) switching one of the multiple receive chains from the first link to a second link of the plurality of links at an end of the TXOP. In such case a number of the multiple spatial streams may be up to a number of total supported spatial streams of the non-AP STA MLD for reception. Alternatively, in communicating with the AP MLD with multi-link dynamic antenna switching, processor 1412 may enable the multi-link dynamic antenna switching by: (a) enabling multiple transmit chains on a first link of a plurality of links; (b) transmitting a data unit from a STA in the non-AP STA MLD to the AP MLD via multiple spatial streams through the multiple transmit chains on the first link during a TXOP; and (c) switching one of the multiple transmit chains from the first link to a second link of the plurality of links at an end of the TXOP. In such cases, a number of the multiple spatial streams may be up to a number of total supported spatial streams of the non-AP STA MLD for transmission. In some implementations, in transmitting the data unit, processor 1412 may perform certain operations. For instance, processor 1412 may receive a TB PPDU from the AP MLD. Moreover, processor 1412 may transmit the data unit to the AP MLD responsive to receiving the TB PPDU.

In some implementations, in receiving the transmission from the AP MLD, processor 1412 may perform additionally operations. For instance, processor 1412 may transmit an action frame to the AP MLD indicating whether multi-link dynamic antenna switching is enabled. Additionally, in response to the action frame indicating that the multi-link dynamic antenna switching is enabled, processor 1412 may receive a group addressed frame from the AP MLD on a first link of a plurality of links. In such cases, the first link may be either implicitly determined as a reception link for the group addressed frame or explicitly indicated in the action frame by a link identifier as the reception link for the group addressed frame.

Alternatively, or additionally, in receiving of the transmission from the AP MLD, processor 1412 may perform additionally operations. For instance, processor 1412 may receive a MU-RTS frame on a second link of the plurality of links while receiving the group addressed frame on the first link. Furthermore, processor 1412 may refrain from transmitting a response corresponding to the MU-RTS frame on the second link while receiving the group addressed frame on the first link.

Alternatively, or additionally, in receiving the transmission from the AP MLD, processor 1412 may perform additionally operations. For instance, processor 1412 may receive no MU-RTS frame on a second link of the plurality of links while receiving the group addressed frame on the first link. Moreover, processor 1412 may receive a MU-RTS frame on the second link after receiving the group addressed frame on the first link. Furthermore, processor 1412 may transmit a CTS frame or a TB PPDU on the second link in response to the MU-RTS frame.

In some implementations, processor 1412 may perform additionally operations. For instance, processor 1412 may transmit to the AP MLD an information element containing indications of capabilities of the non-AP STA MLD. In such cases, the capabilities may include: (i) a STA-level capability of one or more combinations of EHT-MCSs and spatial streams that each STA of a plurality of STAs in the non-AP STA MLD supports regarding reception and transmission, and (ii) an MLD-level capability of one or more combinations of EHT-MCSs and spatial streams that all of the plurality of STAs in the non-AP STA MLD supports regarding reception and transmission.

Regarding multi-link static antenna switching or multi-link semi-static antenna switching, processor 1412 may establish, via transceiver 1416, a multi-link operation over a plurality of links between the AP MLD and the non-AP STA MLD which has a constraint on simultaneous TX/RX on a first link and a second link of the plurality of links. Additionally, processor 1412 may change an antenna configuration of the non-AP STA MLD with respect to one or more receive chains or one or more transmit chains of the non-AP STA MLD between the first link and the second link of the plurality of links in response to a condition being met.

In some implementations, in establishing the multi-link operation, processor 1412 may enable multi-link static antenna switching at the non-AP STA MLD, and wherein the condition comprises detecting a change in channel utilization.

In some implementations, in establishing the multi-link operation, processor 1412 may perform certain operations. For instance, processor 1412 may enable multi-link semi-static antenna switching at the non-AP STA MLD. Additionally, processor 1412 may establish one or more TWT SPs on the first link and the second link. Moreover, processor 1412 may pre-configure a respective antenna configuration corresponding to each of the one or more TWT SPs. In such cases, the condition may involve detecting an onset of each of the one or more TWT SPs. Moreover, in changing the antenna configuration, processor 1412 may, for each of the one or more TWT SPs, apply the respective antenna configuration during the corresponding one of the one or more TWT SPs.

In some implementations, processor 1412 may perform additional operations. For instance, processor 1412 may transmit, via transceiver 1416, a management frame to the AP MLD indicate a respective changed receive chain or a respective changed transmit chain of the non-AP STA MLD for each of the first link and the second link. In some implementations, the management frame may include an Antenna Configuration Switch management frame that indicates, for each of the first link and the second link: (i) a first combination of EHT-MCSs and spatial streams that each STA of a plurality of STAs in the non-AP STA MLD supports regarding reception, and (ii) a second combination of EHT-MCSs and spatial streams that each STA of the plurality of STAs in the non-AP STA MLD supports regarding transmission.

Illustrative Processes

Figure 15:
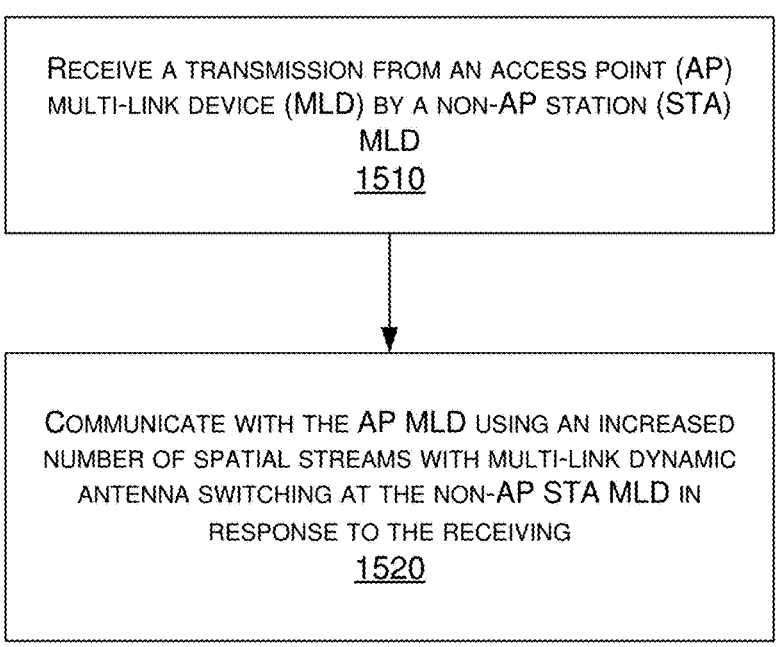
FIG. 15 is a flowchart of an example process in accordance with an implementation of the present disclosure.

FIG. 15 illustrates an example process 1500 in accordance with an implementation of the present disclosure. Process 1500 may represent an aspect of implementing various proposed designs, concepts, schemes, systems and methods described above. More specifically, process 1500 may represent an aspect of the proposed concepts and schemes pertaining to EHT multi-link dynamic antenna switching in wireless communications in accordance with the present disclosure. Process 1500 may include one or more operations, actions, or functions as illustrated by one or more of blocks 1510 and 1520. Although illustrated as discrete blocks, various blocks of process 1500 may be divided into additional blocks, combined into fewer blocks, or eliminated, depending on the desired implementation. Moreover, the blocks/sub-blocks of process 1500 may be executed in the order shown in FIG. 15 or, alternatively in a different order. Furthermore, one or more of the blocks/sub-blocks of process 1500 may be executed repeatedly or iteratively. Process 1500 may be implemented by or in apparatus 1410 and apparatus 1420 as well as any variations thereof. Solely for illustrative purposes and without limiting the scope, process 1500 is described below in the context of apparatus 1410 as STA 110 (e.g., a STA or AP) and apparatus 1420 as STA 120 (e.g., a peer STA or AP) of a wireless network such as a WLAN in accordance with one or more of IEEE 802.11 standards. Process 1500 may begin at block 1510.

At 1510, process 1500 may involve processor 1412 of apparatus 1410 implemented as a non-AP STA MLD receiving, via transceiver 1416, a transmission from an AP MLD (e.g., apparatus 1420). Process 1500 may proceed from 1510 to 1520.

At 1520, process 1500 may involve processor 1412 communicating, via transceiver 1416, with the AP MLD using an increased number of spatial streams with multi-link dynamic antenna switching at the non-AP STA MLD in response to the receiving.

In some implementations, in communicating with the AP MLD with multi-link dynamic antenna switching, process 1500 may involve processor 1412 enabling the multi-link dynamic antenna switching by: (a) receiving a request from the AP MLD requesting for a first number of spatial streams; (b) enabling a second number of spatial streams; and (c) communicating with the AP MLD using the second number of spatial streams. In some implementations, the second number may be equal to the first number. Alternatively, the second number may be different than (e.g., smaller than) the first number.

In some implementations, in receiving the transmission from the AP MLD, process 1500 may involve processor 1412 receiving a RTS frame, a MU-RTS frame, or a CTS frame via a single spatial stream from the AP MLD. In some implementations, in communicating with the AP MLD with multi-link dynamic antenna switching, process 1500 may involve processor 1412 enabling the multi-link dynamic antenna switching by: (a) enabling multiple receive chains on a first link of a plurality of links; (b) receiving a data unit addressed to a STA in the non-AP STA MLD from the AP MLD via multiple spatial streams through the multiple receive chains on the first link during a TXOP; and (c) switching one of the multiple receive chains from the first link to a second link of the plurality of links at an end of the TXOP. In such cases, a number of the multiple spatial streams may be up to a number of total supported spatial streams of the non-AP STA MLD for reception. Alternatively, in communicating with the AP MLD with multi-link dynamic antenna switching, process 1500 may involve processor 1412 enabling the multi-link dynamic antenna switching by: (a) enabling multiple transmit chains on a first link of a plurality of links; (b) transmitting a data unit from a STA in the non-AP STA MLD to the AP MLD via multiple spatial streams through the multiple transmit chains on the first link during a TXOP; and (c) switching one of the multiple transmit chains from the first link to a second link of the plurality of links at an end of the TXOP. In such cases, a number of the multiple spatial streams may be up to a number of total supported spatial streams of the non-AP STA MLD for transmission. In some implementations, in transmitting the data unit, process 1500 may involve processor 1412 performing certain operations. For instance, process 1500 may involve processor 1412 receiving a TB PPDU from the AP MLD. Additionally, process 1500 may involve processor 1412 transmitting the data unit to the AP MLD responsive to receiving the TB PPDU.

In some implementations, in receiving the transmission from the AP MLD, process 1500 may involve processor 1412 receiving a MU-RTS trigger frame, a BSRP trigger frame, or a CTS frame with a single spatial stream from the AP MLD. In some implementations, in communicating with the AP MLD with multi-link dynamic antenna switching, process 1500 may involve processor 1412 enabling the multi-link dynamic antenna switching by: (a) enabling multiple receive chains on a first link of a plurality of links; (b) receiving a data unit addressed to a STA in the non-AP STA MLD from the AP MLD via multiple spatial streams through the multiple receive chains on the first link during a TXOP; and (c) switching one of the multiple receive chains from the first link to a second link of the plurality of links at an end of the TXOP. In such case a number of the multiple spatial streams may be up to a number of total supported spatial streams of the non-AP STA MLD for reception. Alternatively, in communicating with the AP MLD with multi-link dynamic antenna switching, process 1500 may involve processor 1412 enabling the multi-link dynamic antenna switching by: (a) enabling multiple transmit chains on a first link of a plurality of links; (b) transmitting a data unit from a STA in the non-AP STA MLD to the AP MLD via multiple spatial streams through the multiple transmit chains on the first link during a TXOP; and (c) switching one of the multiple transmit chains from the first link to a second link of the plurality of links at an end of the TXOP. In such cases, a number of the multiple spatial streams may be up to a number of total supported spatial streams of the non-AP STA MLD for transmission. In some implementations, in transmitting the data unit, process 1500 may involve processor 1412 performing certain operations. For instance, process 1500 may involve processor 1412 receiving a TB PPDU from the AP MLD. Moreover, process 1500 may involve processor 1412 transmitting the data unit to the AP MLD responsive to receiving the TB PPDU.

In some implementations, in receiving the transmission from the AP MLD, process 1500 may involve processor 1412 performing additionally operations. For instance, process 1500 may involve processor 1412 transmitting an action frame to the AP MLD indicating whether multi-link dynamic antenna switching is enabled. Additionally, in response to the action frame indicating that the multi-link dynamic antenna switching is enabled, process 1500 may involve processor 1412 receiving a group addressed frame from the AP MLD on a first link of a plurality of links. In such cases, the first link may be either implicitly determined as a reception link for the group addressed frame or explicitly indicated in the action frame by a link identifier as the reception link for the group addressed frame.

Alternatively, or additionally, in receiving of the transmission from the AP MLD, process 1500 may involve processor 1412 performing additionally operations. For instance, process 1500 may involve processor 1412 receiving a MU-RTS frame on a second link of the plurality of links while receiving the group addressed frame on the first link. Furthermore, process 1500 may involve processor 1412 refraining from transmitting a response corresponding to the MU-RTS frame on the second link while receiving the group addressed frame on the first link.

Alternatively, or additionally, in receiving the transmission from the AP MLD, process 1500 may involve processor 1412 performing additionally operations. For instance, process 1500 may involve processor 1412 receiving no MU-RTS frame on a second link of the plurality of links while receiving the group addressed frame on the first link. Moreover, process 1500 may involve processor 1412 receiving a MU-RTS frame on the second link after receiving the group addressed frame on the first link. Furthermore, process 1500 may involve processor 1412 transmitting a CTS frame or a TB PPDU on the second link in response to the MU-RTS frame.

In some implementations, process 1500 may involve processor 1412 performing additionally operations. For instance, process 1500 may involve processor 1412 transmitting to the AP MLD an information element containing indications of the capabilities of the non-AP STA MLD. In such cases, the capabilities may include: (i) a STA-level capability of one or more combinations of EHT-MCSs and spatial streams that each STA of a plurality of STAs in the non-AP STA MLD supports regarding reception and transmission, and (ii) an MLD-level capability of one or more combinations of EHT-MCSs and spatial streams that all of the plurality of STAs in the non-AP STA MLD supports regarding reception and transmission.

FIG. 16 illustrates an example process 1600 in accordance with an implementation of the present disclosure. Process 1600 may represent an aspect of implementing various proposed designs, concepts, schemes, systems and methods described above. More specifically, process 1600 may represent an aspect of the proposed concepts and schemes pertaining to EHT multi-link dynamic antenna switching in wireless communications in accordance with the present disclosure. Process 1600 may include one or more operations, actions, or functions as illustrated by one or more of blocks 1610 and 1620. Although illustrated as discrete blocks, various blocks of process 1600 may be divided into additional blocks, combined into fewer blocks, or eliminated, depending on the desired implementation. Moreover, the blocks/sub-blocks of process 1600 may be executed in the order shown in FIG. 16 or, alternatively in a different order. Furthermore, one or more of the blocks/sub-blocks of process 1600 may be executed repeatedly or iteratively. Process 1600 may be implemented by or in apparatus 1410 and apparatus 1420 as well as any variations thereof. Solely for illustrative purposes and without limiting the scope, process 1600 is described below in the context of apparatus 1410 as STA 110 (e.g., a STA or AP) and apparatus 1420 as STA 120 (e.g., a peer STA or AP) of a wireless network such as a WLAN in accordance with one or more of IEEE 802.11 standards. Process 1600 may begin at block 1610.

At 1610, process 1600 may involve processor 1412 of apparatus 1410 implemented as a non-AP STA MLD establishing, via transceiver 1416, a multi-link operation over a plurality of links between an AP MLD (e.g., apparatus 1420) and the non-AP STA MLD which has a constraint on simultaneous TX/RX on a first link and a second link of the plurality of links. Process 1600 may proceed from 1610 to 1620.

At 1620, process 1600 may involve processor 1412 changing an antenna configuration of the non-AP STA MLD with respect to one or more receive chains or one or more transmit chains of the non-AP STA MLD between the first link and the second link of the plurality of links in response to a condition being met.

In some implementations, in establishing the multi-link operation, process 1600 may involve processor 1412 enabling multi-link static antenna switching at the non-AP STA MLD, and wherein the condition comprises detecting a change in channel utilization.

In some implementations, in establishing the multi-link operation, process 1600 may involve processor 1412 performing certain operations. For instance, process 1600 may involve processor 1412 enabling multi-link semi-static antenna switching at the non-AP STA MLD. Additionally, process 1600 may involve processor 1412 establishing one or more TWT SPs on the first link and the second link. Moreover, process 1600 may involve processor 1412 pre-configuring a respective antenna configuration corresponding to each of the one or more TWT SPs. In such cases, the condition may involve detecting an onset of each of the one or more TWT SPs. Moreover, in changing the antenna configuration, process 1600 may involve processor 1412, for each of the one or more TWT SPs, applying the respective antenna configuration during the corresponding one of the one or more TWT SPs.

In some implementations, process 1600 may involve processor 1412 performing additional operations. For instance, process 1600 may involve processor 1412 transmitting, via transceiver 1416, a management frame to the AP MLD indicate a respective changed receive chain or a respective changed transmit chain of the non-AP STA MLD for each of the first link and the second link. In some implementations, the management frame may include an Antenna Configuration Switch management frame that indicates, for each of the first link and the second link: (i) a first combination of EHT-MCSs and spatial streams that each STA of a plurality of STAs in the non-AP STA MLD supports regarding reception, and (ii) a second combination of EHT-MCSs and spatial streams that each STA of the plurality of STAs in the non-AP STA MLD supports regarding transmission.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
   receiving a transmission from an access point (AP) multi-link device (MLD) by a non-AP station (STA) MLD; and
   responsive to the receiving, communicating with the AP MLD using an increased number of spatial streams with multi-link dynamic antenna switching at the non-AP STA MLD,
   wherein the communicating with the AP MLD comprises enabling multiple receive chains and multiple transmit chains corresponding to multiple spatial streams of the increased number of spatial streams.

2. The method of claim 1, wherein the communicating with the AP MLD with multi-link dynamic antenna switching comprises enabling the multi-link dynamic antenna switching by:
   receiving a request from the AP MLD requesting for a first number of spatial streams;
   enabling a second number of spatial streams; and
   communicating with the AP MLD using the second number of spatial streams,
   wherein the second number is equal to or different than the first number.

3. The method of claim 1, wherein the receiving of the transmission from the AP MLD comprises receiving a request-to-send (RTS) frame, a multi-user request-to-send (MU-RTS) frame, or a clear-to-send (CTS) frame via a single spatial stream from the AP MLD.

4. The method of claim 3, wherein the communicating with the AP MLD with multi-link dynamic antenna switching comprises enabling the multi-link dynamic antenna switching by:
   enabling the multiple receive chains on a first link of a plurality of links;
   receiving a data unit addressed to a STA in the non-AP STA MLD from the AP MLD via the multiple spatial streams through the multiple receive chains on the first link during a transmission opportunity (TXOP); and
   switching one of the multiple receive chains from the first link to a second link of the plurality of links at an end of the TXOP,
   wherein a number of the multiple spatial streams is up to a number of total supported spatial streams of the non-AP STA MLD for reception.

5. The method of claim 3, wherein the communicating with the AP MLD with multi-link dynamic antenna switching comprises enabling the multi-link dynamic antenna switching by:
   enabling the multiple transmit chains on a first link of a plurality of links;
   transmitting a data unit from a STA in the non-AP STA MLD to the AP MLD via the multiple spatial streams through the multiple transmit chains on the first link during a transmission opportunity (TXOP); and
   switching one of the multiple transmit chains from the first link to a second link of the plurality of links at an end of the TXOP,
   wherein a number of the multiple spatial streams is up to a number of total supported spatial streams of the non-AP STA MLD for transmission.

6. The method of claim 5, wherein the transmitting of the data unit comprises:
   receiving a trigger-based (TB) Physical Layer Convergence Protocol (PLCP) Protocol Data Unit (PPDU) from the AP MLD; and
   transmitting the data unit to the AP MLD responsive to receiving the TB PPDU.

7. The method of claim 1, wherein the receiving of the transmission from the AP MLD comprises receiving a multi-user request-to-send (MU-RTS) trigger frame, a buffer status report poll (BSRP) trigger frame, or a clear-to-send (CTS) frame with a single spatial stream from the AP MLD.

8. The method of claim 7, wherein the communicating with the AP MLD with multi-link dynamic antenna switching comprises enabling the multi-link dynamic antenna switching by:
   enabling the multiple receive chains on a first link of a plurality of links;
   receiving a data unit addressed to a STA in the non-AP STA MLD from the AP MLD via the multiple spatial streams through the multiple receive chains on the first link during a transmission opportunity (TXOP); and
   switching one of the multiple receive chains from the first link to a second link of the plurality of links at an end of the TXOP,
   wherein a number of the multiple spatial streams is up to a number of total supported spatial streams of the non-AP STA MLD for reception.

9. The method of claim 7, wherein the communicating with the AP MLD with multi-link dynamic antenna switching comprises enabling the multi-link dynamic antenna switching by:
  enabling the multiple transmit chains on a first link of a plurality of links;
  transmitting a data unit from a STA in the non-AP STA MLD to the AP MLD via the multiple spatial streams through the multiple transmit chains on the first link during a transmission opportunity (TXOP); and
  switching one of the multiple transmit chains from the first link to a second link of the plurality of links at an end of the TXOP,
  wherein a number of the multiple spatial streams is up to a number of total supported spatial streams of the non-AP STA MLD for transmission.

10. The method of claim 9, wherein the transmitting of the data unit comprises:
  receiving a trigger-based (TB) Physical Layer Convergence Protocol (PLCP) Protocol Data Unit (PPDU) from the AP MLD; and
  transmitting the data unit to the AP MLD responsive to receiving the TB PPDU.

11. The method of claim 1, wherein the receiving of the transmission from the AP MLD comprises:
  transmitting an action frame to the AP MLD indicating whether multi-link dynamic antenna switching is enabled; and
  responsive to the action frame indicating that the multi-link dynamic antenna switching is enabled, receiving a group addressed frame from the AP MLD on a first link of a plurality of links,
  wherein the first link is either implicitly determined as a reception link for the group addressed frame or explicitly indicated in the action frame by a link identifier as the reception link for the group addressed frame.

12. The method of claim 11, wherein the receiving of the transmission from the AP MLD further comprises:
  receiving a multi-user request-to-send (MU-RTS) frame on a second link of the plurality of links while receiving the group addressed frame on the first link; and
  refraining from transmitting a response corresponding to the MU-RTS frame on the second link while receiving the group addressed frame on the first link.

13. The method of claim 11, wherein the receiving of the transmission from the AP MLD further comprises:
  receiving no multi-user request-to-send (MU-RTS) frame on a second link of the plurality of links while receiving the group addressed frame on the first link;
  receiving a MU-RTS frame on the second link after receiving the group addressed frame on the first link; and
  transmitting a clear-to-send (CTS) frame or a trigger-based (TB) Physical Layer Convergence Protocol (PLCP) Protocol Data Unit (PPDU) on the second link in response to the MU-RTS frame.

14. The method of claim 1, further comprising:
  transmitting to the AP MLD an information element containing indications of capabilities of the non-AP STA MLD comprising:
    a STA-level capability of one or more combinations of extreme-high-throughput modulation and coding schemes (EHT-MCSs) and spatial streams that each STA of a plurality of STAs in the non-AP STA MLD supports regarding reception and transmission, and
    an MLD-level capability of one or more combinations of EHT-MCSs and spatial streams that all of the plurality of STAs in the non-AP STA MLD supports regarding reception and transmission.

15. A method, comprising:
  establishing a multi-link operation over a plurality of links between an access point (AP) multi-link device (MLD) and a non-AP station (STA) MLD which has a constraint on simultaneous transmission and reception (Tx/Rx) on a first link and a second link of the plurality of links; and
  responsive to a condition being met, changing an antenna configuration of the non-AP STA MLD with respect to one or more receive chains or one or more transmit chains of the non-AP STA MLD between the first link and the second link of the plurality of links,
  wherein the establishing of the multi-link operation comprises enabling multiple receive chains and multiple transmit chains corresponding to multiple spatial streams.

16. The method of claim 15, wherein the establishing of the multi-link operation comprises enabling multi-link static antenna switching at the non-AP STA MLD, and wherein the condition comprises detecting a change in channel utilization.

17. The method of claim 15, wherein the establishing of the multi-link operation comprises:
  enabling multi-link semi-static antenna switching at the non-AP STA MLD;
  establishing one or more target wake time (TWT) session periods (SPs) on the first link and the second link; and
  pre-configuring a respective antenna configuration corresponding to each of the one or more TWT SPs,
  wherein the condition comprises detecting an onset of each of the one or more TWT SPs, and
  wherein the changing of the antenna configuration comprises, for each of the one or more TWT SPs, applying the respective antenna configuration during the corresponding one of the one or more TWT SPs.

18. The method of claim 15, further comprising:
  transmitting a management frame to the AP MLD indicate a respective changed receive chain or a respective changed transmit chain of the non-AP STA MLD for each of the first link and the second link.

19. The method of claim 18, wherein the management frame comprises an Antenna Configuration Switch management frame that indicates, for each of the first link and the second link:
  a first combination of extreme-high-throughput modulation and coding schemes (EHT-MCSs) and spatial streams that each STA of a plurality of STAs in the non-AP STA MLD supports regarding reception, and
  a second combination of EHT-MCSs and spatial streams that each STA of the plurality of STAs in the non-AP STA MLD supports regarding transmission.

20. An apparatus, comprising:
  a transceiver configured to communicate wirelessly; and
  a processor coupled to the transceiver and configured to perform operations comprising:
    establishing, via the transceiver, a multi-link operation over a plurality of links between an access point (AP) multi-link device (MLD) and a non-AP station (STA) MLD; and
    communicating, via the transceiver, with the AP MLD with multi-link dynamic antenna switching, multi-link static antenna switching, or multi-link semi-static antenna switching,
  wherein the communicating with the AP MLD comprises enabling multiple receive chains and multiple transmit chains corresponding to multiple spatial streams of the increased number of spatial streams.

* * * * *